(12) United States Patent
Shimo et al.

(10) Patent No.: US 8,270,074 B2
(45) Date of Patent: Sep. 18, 2012

(54) MAGNIFIED-PROJECTION OPTICAL SYSTEM AND DIGITAL TYPE PLANETARIUM DEVICE

(75) Inventors: Mitsuaki Shimo, Osaka (JP); Katsuhiro Takamoto, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 52 days.

(21) Appl. No.: 12/919,080

(22) PCT Filed: Feb. 20, 2009

(86) PCT No.: PCT/JP2009/053013
§ 371 (c)(1),
(2), (4) Date: Aug. 24, 2010

(87) PCT Pub. No.: WO2009/107553
PCT Pub. Date: Sep. 3, 2009

(65) Prior Publication Data
US 2011/0002034 A1   Jan. 6, 2011

(30) Foreign Application Priority Data

Feb. 29, 2008   (JP) ................................ 2008 050819

(51) Int. Cl.
*G02B 23/24* (2006.01)
(52) U.S. Cl. ....................................... 359/434; 359/649
(58) Field of Classification Search ........................ None
See application file for complete search history.

(56) References Cited

U.S. PATENT DOCUMENTS

| | | | |
|---|---|---|---|
| 4,070,098 A * | 1/1978 | Buchroeder | 359/725 |
| 7,009,765 B2 | 3/2006 | Gohman | 359/434 |
| 7,136,236 B2 | 11/2006 | Ohashi | 359/749 |
| 7,621,647 B1 * | 11/2009 | Colucci et al. | 353/121 |
| 2002/0141053 A1 * | 10/2002 | Colucci et al. | 359/435 |
| 2004/0032653 A1 | 2/2004 | Gohman | 359/434 |
| 2004/0223123 A1 | 11/2004 | Engle | |

(Continued)

FOREIGN PATENT DOCUMENTS

CN   1692297 A   11/2005

(Continued)

OTHER PUBLICATIONS

Search Report issued on Feb. 1, 2012 in the corresponding European Patent Office application No. EP 09 71 5446.

*Primary Examiner* — Lee Fineman
(74) *Attorney, Agent, or Firm* — Cozen O'Connor

(57) ABSTRACT

Provided is a magnified-projection optical system, which can retain a considerably long back focus although a focal length is short and which has a small chromatic aberration. The optical system comprises a projecting optical system, a relay optical system and a display element, which are sequentially arrayed from a screen side along the optical axis. The projecting optical system enlarges and projects the image, which has been linearly focused by the relay optical system, on the screen, and includes a negative group and a positive group arrayed sequentially from the screen side and having a negative optical power and a positive optical power, respectively. The optical system satisfies the following conditional relations of $|Fb/F|>10$ and $0.5<|F/Fp|<2.0$, wherein Fb: the back focus of the whole optical system including the projecting optical system and the relay optical system, F: the focal length of the whole optical system, and FP: the focal length of the projecting optical system,

16 Claims, 11 Drawing Sheets

U.S. PATENT DOCUMENTS

| | | |
|---|---|---|
| 2005/0088762 A1 | 4/2005 | Ohashi |
| 2007/0159607 A1 | 7/2007 | Nishigaki ................. 359/94 |

FOREIGN PATENT DOCUMENTS

| | | |
|---|---|---|
| JP | 4-69611 A | 3/1992 |
| JP | 2002-131637 A | 5/2002 |
| JP | 2005-128286 A | 5/2005 |
| JP | 2005-221955 A | 8/2005 |
| JP | 2006-523318 A | 10/2006 |
| JP | 2006-330410 A | 12/2006 |
| JP | 2007-187695 A | 7/2007 |
| TW | 200403450 | 8/1992 |
| TW | I 278654 | 8/1992 |
| WO | WO 2004/017101 A2 | 2/2004 |
| WO | WO 2009/107553 A1 | 9/2009 |

* cited by examiner

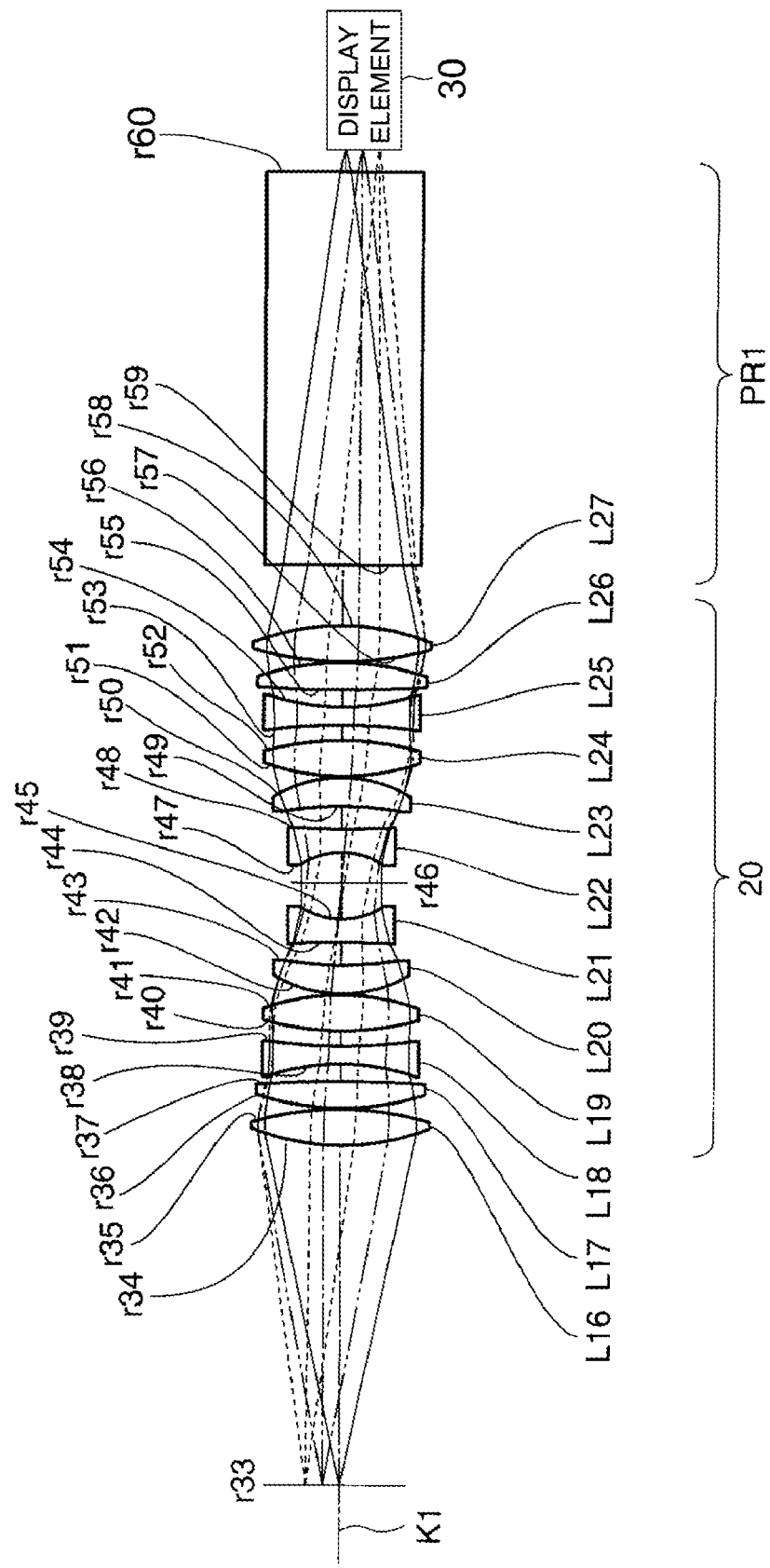

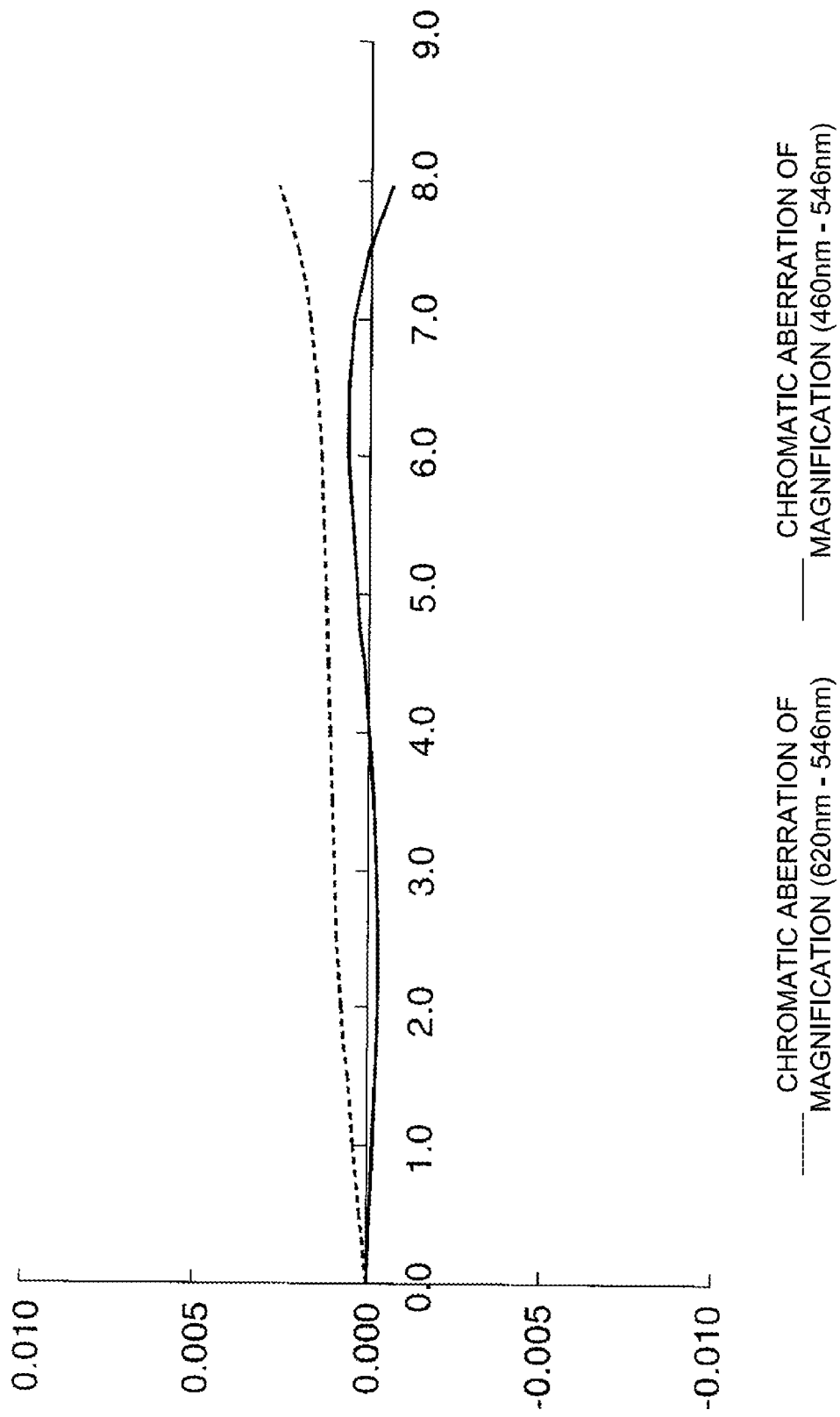

MAGNIFIED-PROJECTION OPTICAL SYSTEM AND DIGITAL TYPE PLANETARIUM DEVICE

RELATED APPLICATIONS

This application is a U.S. National Phase Application under 35 U.S.C. 371 of International Application No. PCT/JP2009/053013, filed with Japanese Patent Office on Feb. 20, 2009, which claims priority to Japanese Patent Application No. 2008-050819, filed Feb. 29, 2008.

FIELD OF THE INVENTION

The present invention relates to a projection optical system for projecting an image outputted from the display element such as a liquid crystal element and digital device.

BACKGROUND OF THE INVENTION

In amusement facilities and others, a digital image is projected on a large-sized screen and dome-type screen in recent years: One of the known display devices for implementing this operation is a display device using a display element such as a liquid crystal element and digital micro-device, instead of the display device for projecting a film on a screen. This type of display device is equipped with a display element for outputting each of the R, G and B, for example, a prism for color-superimposition of the image outputted from each display element, a projection optical system for enlarging and projecting an image color-superimposed by the prism, and a screen for displaying the enlarged and projected image.

The display element to be adopted in the display device of this type is getting more and more highly intergraded every year, and the entire size of the element is getting larger and larger, accordingly. Increased size of the display element requires the prism size to be increased. To ensure the space for accommodating a large-sized prism, a projection optical system having a very long back focus is essential. Especially when color synthesis is to be made by a color synthesis prism, the color synthesis prism must be made larger (longer) if the display element is increased in size. To ensure a space for accommodating a large-sized color synthesis prism, a very long back focus is necessary.

In recent years, to increase the brightness of the image projected on the screen, there has been a growing tendency to increase the size of the illumination system. This requires a projection optical system having a very long back focus.

In recent years, the image outputted from the display element is required to be projected onto a large screen at a short distance. To achieve this objective, the projection optical system is required to have a wider angle (shorter focusing).

The close-packed structure of a display element in recent years requires a high-resolution projection optical system of reduced chromatic aberration. To put it another way, the close-packed structure of a display element requires the projection optical system to provide higher projecting performances. Particularly, if the chromatic aberration is not reduced to a low level, a high-performance and hence a clearly projected image cannot be obtained.

Projection optical systems related to the present invention are disclosed in the following Patent Literatures. Patent Literature 1 discloses a fisheye lens projection optical system for projecting the image of a film on a dome-shaped screen. Patent Literature 2 discloses a fisheye lens projection optical system for a liquid crystal projector. Patent Literature 3 discloses a fisheye lens projection optical system wherein the back focus of a certain length is ensured.

Patent Literature 1: Japanese Unexamined Patent Application Publication No. Hei 4(1992)-69611

Patent Literature 2: Japanese Unexamined Patent Application Publication No. 2005-221955

Patent Literature 3: Japanese Unexamined Patent Application Publication No. 2005-128286

DISCLOSURE OF INVENTION

Problems to be Solved by the Invention

However, there is a trade-off relationship between the wider angle and longer back focus. It is very difficult to implement a projection optical system that meets these two requirements. Further, the back focuses of the projection optical systems ensured in the disclosed Patent Literatures 1 through 3 are about three times, seven times and ten times the focal distance. However, there is no description as to correction of the aberration. These disclosures require improvement in this respect.

The object of the present invention is to provide a magnified-projection optical system characterized by a very long back focus and reduced chromatic aberration, despite a small focal distance.

Means for Solving the Problems

The object of the present invention can be achieved by the invention described in any one of the following Structures 1 through 16. The terms used in the following description are defined as follows in this Specification.

(a) The refractive index corresponds to the wavelength (587.56 nm) of lined.

(b) The Abbe's number can be obtained from the following definition formula wherein the refractive indexes with respect to lined and line F (486.13 nm) and line C (656.28 nm) are nd, nF and nC, and the Abbe's number is vd:

$$vd=(nd-1)/(nF-nC)$$

(c) Terms "concave", "convex" and "meniscus" of a lens indicate the shapes of a lens in the vicinity of the optical axis (close to the lens center) (represented according to the paraxial curvature).

1. A magnified-projection optical system for magnified-projection of an image outputted from a display element onto a screen, including a projection optical system, a relay optical system and a display element, which are arranged sequentially along the optical axis in that order as viewed from the screen side, wherein the relay optical system forms a primary image of the image outputted from the display element, and the projection optical system provides magnified-projection of the image subjected to primary image formation by the relay optical system onto the screen and includes a negative group having a negative optical power and a positive group having a positive optical power arranged sequentially in that order as viewed from the screen;

wherein the negative group includes:

at least one negative meniscus lens arranged on the screen side; and at least one positive lens; and wherein the aforementioned projection optical system and relay optical system satisfy the following conditional expressions (1) and (2):

$$|Fb/F|>10 \quad (1)$$

$$0.5<|F/Fp|<2 \quad (2)$$

wherein Fb is the back focus of the entire optical system including the projection optical system and relay optical system, F is the focal distance of the entire optical system and Fp represents the focal distance of the projection optical system.

2. The magnified-projection optical system described in the aforementioned Structure 1 wherein the angle of view of the entire optical system satisfies the following conditional expression (A1).

$$240 \text{ degrees} > W > 100 \text{ degrees} \tag{A1}$$

where W indicates the angle of view of the entire optical system.

3. The magnified-projection optical system described in the aforementioned Structure 1 or 2 wherein the projection optical system and relay optical system satisfy the following conditional expression (3):

$$0.3 < |Fp/Fm| < 3 \tag{3}$$

where Fm is the focal distance of the negative group of the projection optical system and Fp indicates the focal distance of the projection optical system.

4. The magnified-projection optical system described in any one of the aforementioned Structures 1 through 3 wherein at least one positive lens is located closer to the screen than the position wherein the off-axis major light crosses the optical axis on the side closest to the screen.

5. The magnified-projection optical system described in any one of the aforementioned Structures 1 through 4 wherein the aforementioned projection optical system and relay optical system satisfy the following conditional expression (4):

$$Yp/Ym > 0.8 \tag{4}$$

where Yp is the maximum value for the height of light on the surface of the positive lens due to the off-axis paraxial tracing of the main light of the angle of view corresponding to seventy percent of the outermost angle of view, out of the positive lenses located closer to the screen than the position wherein the off-axis major light crosses the optical axis on the side closest to the screen, in the positive group of the projection optical system; and Ym is the minimum value for the height of light on the surface of the negative lens due to the off-axis paraxial tracing of the main light of the angle of view corresponding to seventy percent of the outermost angle of view, in the area wherein there is an arrangement of the negative lens constituting the negative group of the projection optical system.

6. The magnified-projection optical system described in any one of the aforementioned Structures 1 through 5 wherein the positive group of the projection optical system includes at least one positive lens that satisfies the conditional expression (5):

$$20 < \nu pm - \nu pp < 65 \tag{5}$$

where $\nu pm$ is the Abbe's number of the lens having the greatest Abbe's number in the negative group of the projection optical system; and $\nu pp$ is the Abbe's number of the positive lens.

7. The magnified-projection optical system described in any one of the aforementioned Structures 1 through 6 wherein the relay optical system is an optical system wherein the side of the aforementioned display element is approximately telecentric, and the approximately telecentric optical system satisfies the following conditional expression (6):

$$|\theta max| < 5 \tag{6}$$

where $\theta$max is the maximum angle formed by the normal line of the display element and the major light traveling from the display element toward the relay optical system.

8. The magnified-projection optical system described in Structure 7 wherein the relay optical system is approximately telecentric on both sides and the approximately telecentric optical system on both sides satisfies the following conditional expression (7):

$$|\theta' max| < 5 \tag{7}$$

where $\theta'$max is the maximum angle formed by the normal line of the primary image forming surface and the major light passing through the primary image forming surface from the display element.

9. The magnified-projection optical system described in a Structure 8 wherein the approximately telecentric optical system on both sides satisfies the following conditional expression (8):

$$|\phi r \times Tr| < 0.2 \tag{8}$$

where $\phi r$ is an optical power of the relay optical system, and Tr is a distance from the vertex of surface on the screen side of the lens located closest to the screen in the relay optical system, to the vertex of surface of the display element side of the lens located closest to the display element 10. The magnified-projection optical system described in any one of the aforementioned Structures 1 through 9 wherein the entrance pupil position of the projection optical system and the total length of the projection optical system satisfy the following conditional expression (A3):

$$Le/TLp > 0.02 \tag{A3}$$

where Le is a distance from the vertex of surface of the lens located closest to the screen in the projection optical system, to the entrance pupil position when optical tracing is performed from the screen side of the projection optical system toward the display element; and TLp is the total length of the projection optical system (from the vertex of surface of the lens located closest to the screen in the projection optical system to the vertex of surface of the lens closest to the relay optical system).

11. The magnified-projection optical system described in any one of the aforementioned Structures 1 through 10 wherein the effective diameter of the lens closest to the screen in the projection optical system and the focal distance of the projection optical system satisfy the following conditional expression (A4):

$$D1/Fp < 40 \tag{A4}$$

where D1 is the effective diameter of the lens closest to the screen in the projection optical system, and Fp is the focal distance of the projection optical system.

12. The magnified-projection optical system described in any one of the aforementioned Structures 1 through 11 wherein the focal distances of the front and rear groups of the relay optical system satisfy the following conditional expression (A8).

$$2 > |Frf/Frr| > 0.5 \tag{A8}$$

where Frf is the focal distance of the front group of the relay optical system and Frr is the focal distance of the rear group of the relay optical system.

13. The magnified-projection optical system described in any one of the aforementioned Structures 1 through 12 wherein the relay optical system has at least two low-dispersion lenses and satisfies the following conditional expressions (A11) and (A12):

$$120 > \nu dr > 65 \tag{A11}$$

$$Pgfr < 0.55 \tag{A12}$$

where vdr is the Abbe's number of the low-dispersion lens of the relay optical system and Pgfr is the secondary dispersion of the low-dispersion lens of the relay optical system.

14. The magnified-projection optical system described in any one of the aforementioned. Structures 1 through 13 wherein the major light having the maximum the angle of view passing through at least one positive lens of the positive group in the projection optical system and the major light having the maximum the angle of view passing through the lens located closest to the screen in the negative group in the projection optical system travel in the same direction with respect to the optical axis, and satisfy the following conditional expression (B1):

$$0.8 > \phi Rp/\phi Rn > 0.3 \quad (B1)$$

where ϕRp is the maximum of the effective diameters of the positive lens of the positive group in the projection optical system, and ϕRn is the effective diameter on the screen side of the negative lens located closest to the screen in the projection optical system.

15. The magnified-projection optical system described in any one of the aforementioned Structure 14 wherein the maximum of the effective diameters of the positive lens of the positive group in the projection optical system and the focal distance of at least one positive lens in the positive group of the projection optical system satisfy the following conditional expression (B2):

$$4 > \phi Rp/fp > 0.05 \quad (B2)$$

where ϕRp is the maximum of the effective diameters of the positive lens of the positive group in the projection optical system, and ϕfp is the focal distance of at least one positive lens in the positive group of the projection optical system.

16. A digital type planetarium device including any one of Structures 1 through 15.

EFFECTS OF THE INVENTION

The present invention provides a high-performance magnified-projection optical system characterized by a very long back focus and reduced chromatic aberration, despite a small focal distance.

BRIEF DESCRIPTION OF THE DRAWINGS

FIG. 9 is an overall schematic diagram representing a relay optical system in the second embodiment;

FIG. 11 is a lateral chromatic aberration diagram in the second embodiment.

Figure 1:
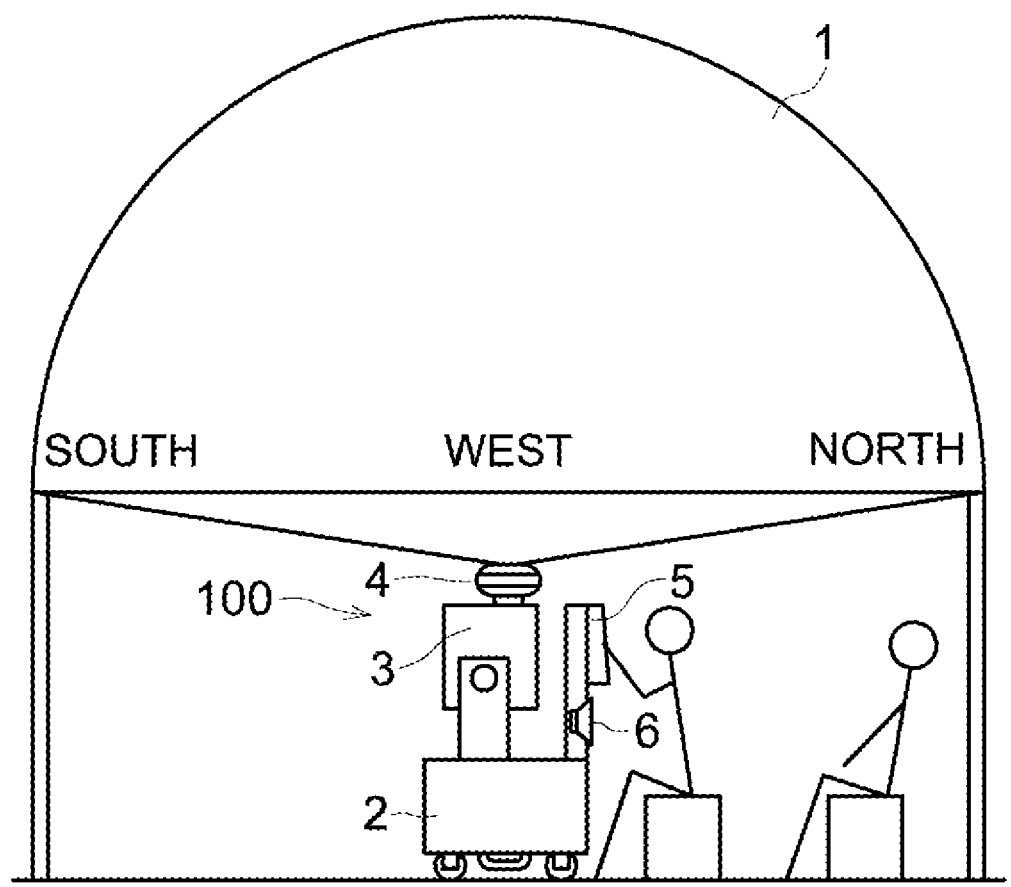
FIG. 1 is an overall schematic diagram representing a screen of the digital type planetarium device.

DESCRIPTION OF REFERENCE NUMERALS 1. screen
2. reproduction section
3. projection section
4. magnified-projection optical system
5. operation section
6. speaker
10. projection optical system
20. relay optical system
30. display element
G1. negative group
G2. positive group
PR1. prism

BEST MODE FOR CARRYING OUT THE INVENTION

The following description uses an example of the case wherein the magnified-projection optical system as an embodiment of the present invention is applied to a digital type planetarium device. FIG. 1 is an overall schematic diagram representing a screen of the digital type planetarium device. The digital type planetarium device shown in FIG. 1 is provided with a screen 1, reproduction section 2, projection section 3, magnified-projection optical system 4, operation section 5 and speaker 6.

The screen 1 is a hemispherical dome screen. The reproduction section 2 reproduces the video image projected on the screen 1 and the audio image broadcast in planetarium facilities. The projection section 3 generates the video image using the signal outputted from the reproduction section 2. The magnified-projection optical system 4 projects the video image generated from the projection section 3, over the whole-sky area of the screen 1. The operation section 5 accepts the input operation by a user.

Figure 2:
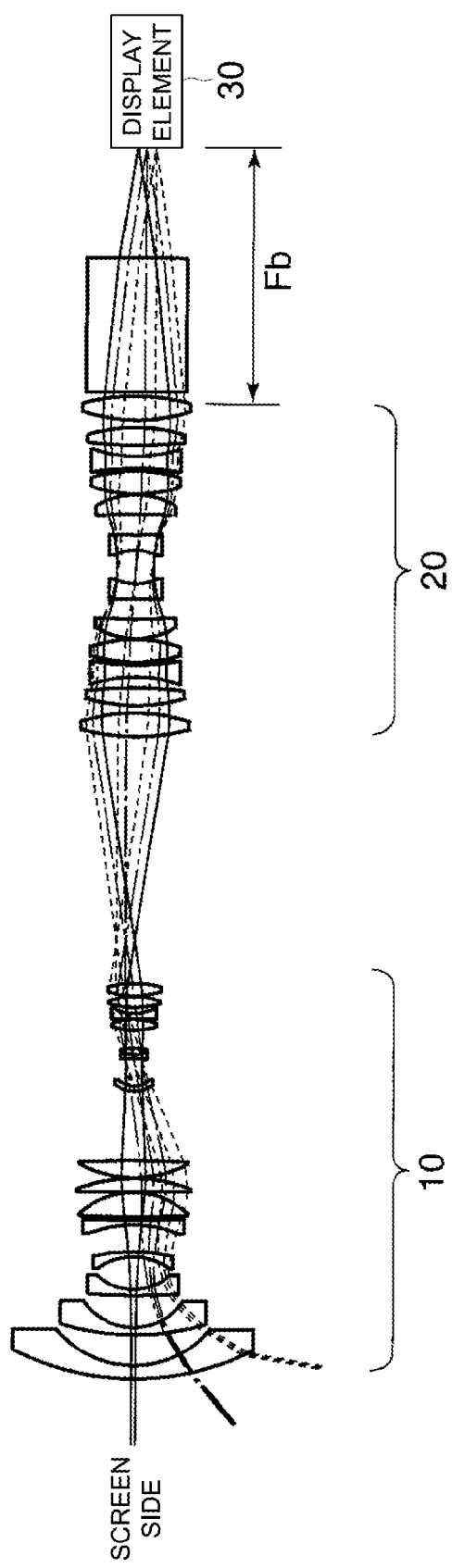
FIG. 2 is an overall schematic diagram representing a magnified-projection optical system in the first embodiment.

FIG. 2 is an overall schematic diagram representing a magnified-projection optical system 4. The magnified-projection optical system 4 includes a projection optical system 10, relay optical system 20 and display element 30 which are arranged sequentially along the optical axis K1 in that order as viewed from the screen, and provides magnified-projection of the image outputted from the display element 30, on the screen.

Figure 3:
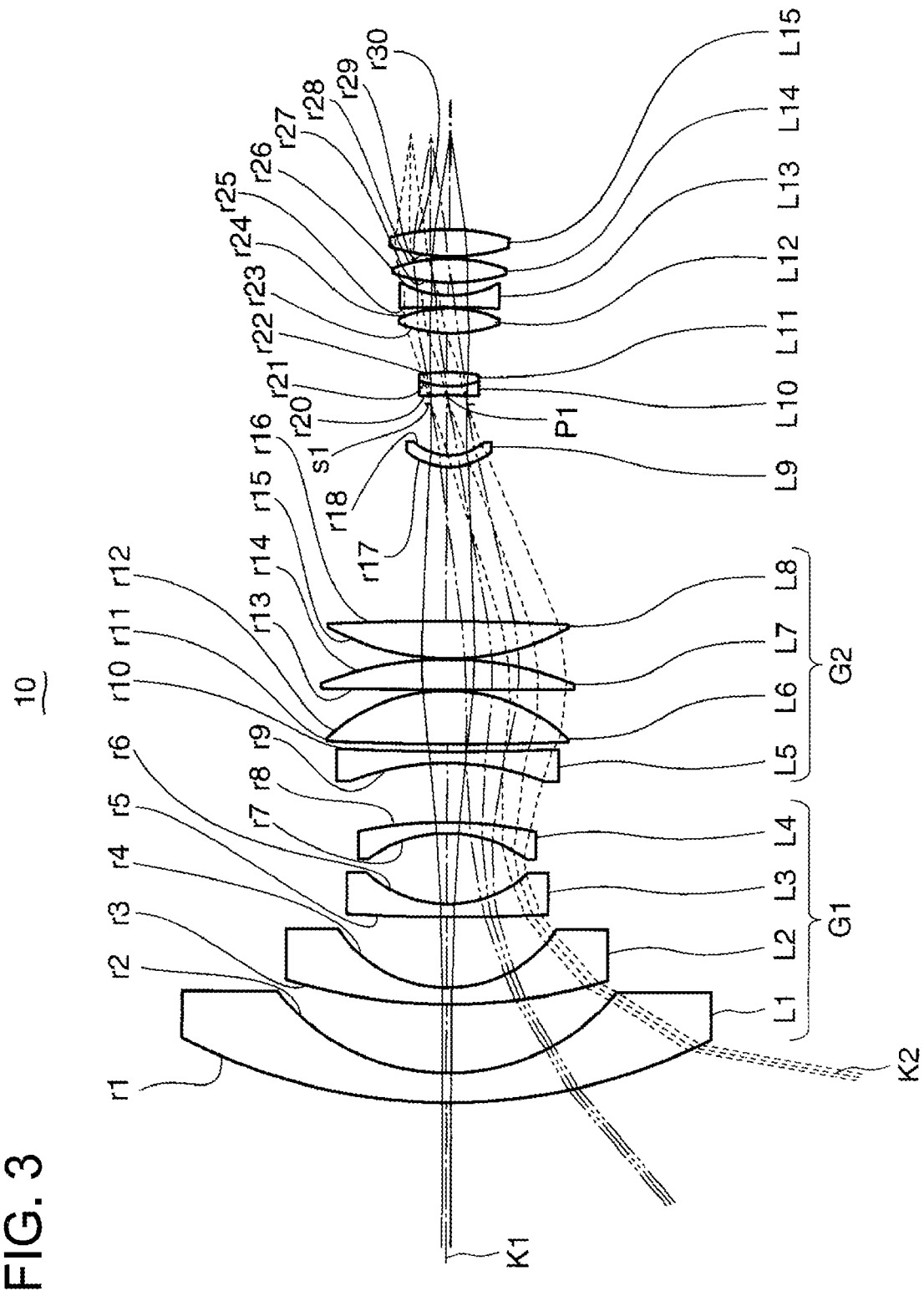
FIG. 3 is an overall schematic diagram representing a projection optical system in the first embodiment.

FIG. 3 is an overall schematic diagram representing a projection optical system 10. The projection optical system 10 projects the image primarily formed by the relay optical system, on the screen 1 in a magnified form, and includes a negative group G1 having a negative optical power, a positive group G2 having a positive optical power, seven lenses L9 through L15, and a stop S1 arranged between the lenses L9 and L10, these components being arranged sequentially in that order as viewed flora the screen 1.

The negative group G1 includes the lens L1 through L4 arranged sequentially in that order as viewed from the screen. The lens L1 through L3 are negative meniscus lenses convexed to the screen 1. The lens L4 is a negative meniscus lens convexed to the display element 30. The lens L1 through L3 correspond to an example of at least one negative meniscus lens of the negative group G1. The lens L4 corresponds to an example of at least one negative lens of the negative group G1.

The positive group G2 includes four lenses L5 through L8. The lens L9 is a meniscus lens convexed to the screen 1. The lens L10 is a double concave lens. The lens L11 is a double convex lens. The lens L12 is a double convex lens. The lens L13 is a double concave lens. The lenses L14 and L15 are double convex lenses.

FIG. 3 shows three negative lenses convexed to the screen 1 contained in the negative group G1. Without the present invention being restricted thereto, it is only required that at least one negative meniscus lens should be located on the side of the screen 1. In FIG. 3, the lens L4 is shown as a negative lens contained in the negative group G1. Without the present invention being restricted thereto, it is only required that at least one negative lens should be included. Two or more negative lenses can be contained.

In FIG. 3, the lenses L1 through L4 are shown as forming a negative group G1. Without being restricted thereto, other lenses can be included if a negative optical power is provided as a whole. The lenses L5 through L8 are shown as forming a positive group G2. Without being restricted thereto, other lenses can be included if a positive optical power is provided as a whole. In FIG. 3, the lenses L9 through L15 are included in addition to the negative group G1 and positive group G2. These lenses can be eliminated.

Figure 4:
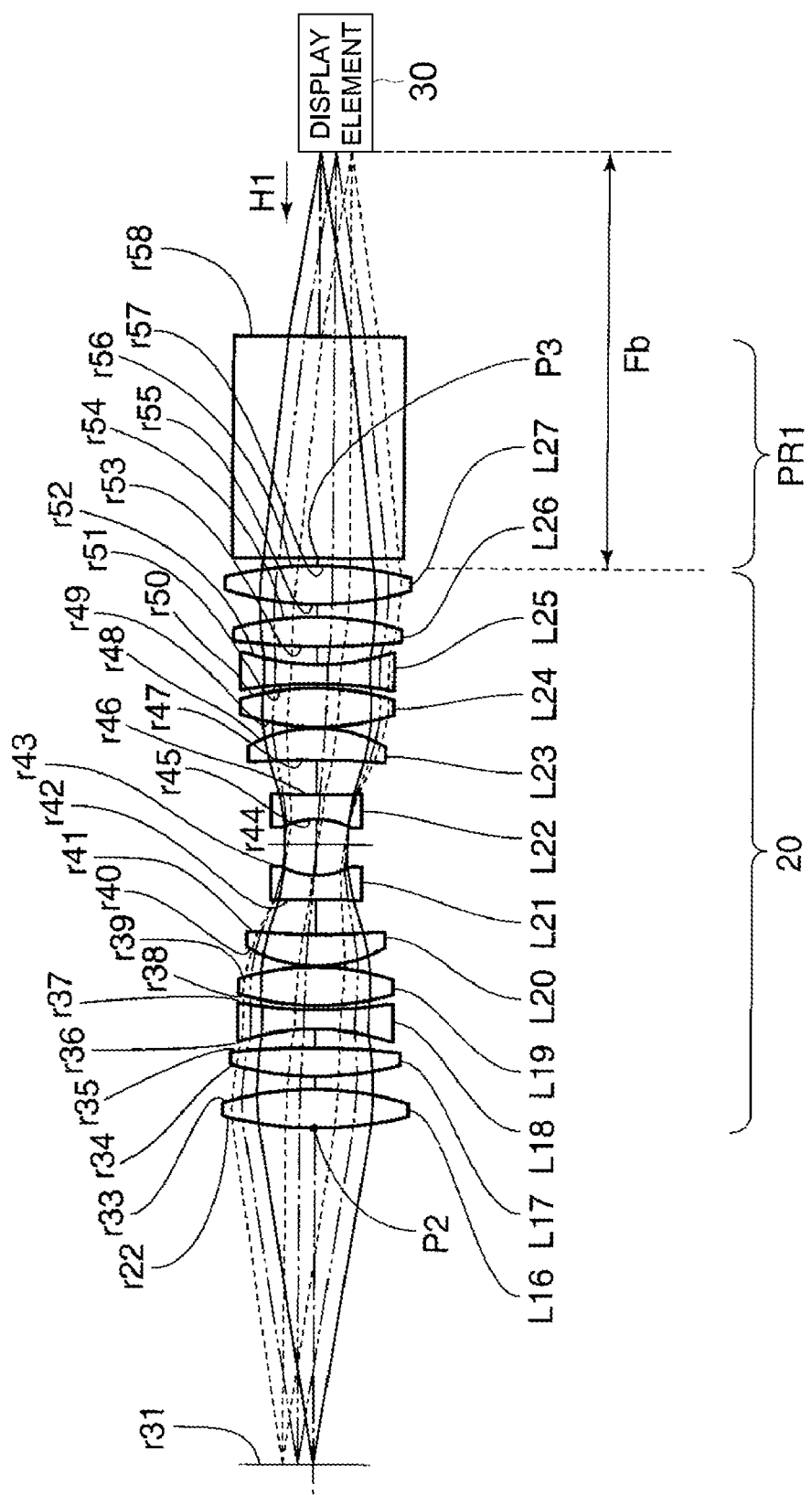
FIG. 4 is an overall schematic diagram representing a relay optical system.

FIG. 4 is an overall schematic diagram representing a relay optical system 20. The relay optical system 20 includes lenses L16 through L27 arranged in that order as viewed from the screen 1. The relay optical system 20 forms a primary image of an image outputted from the display element 30 and color-synthesized by the prism PR1, and outputs this image to the projection optical system 10.

The lenses L16, L17, L19, L24, L26 and L27 are double convex lenses. The lens 20 is a meniscus lens convexed to the screen 1. The lens L23 is a meniscus lens convexed to the display element 30. The L18, L21, L22 and L25 are double concave lenses. The lenses L16 through L27 are symmetric with respect to the r44 representing a dummy surface.

The prism PR1 is arranged between the lens L27 and display element 30. The prism PR1 color-synthesizes the image outputted from the display element 30 and outputs the resulting image to the relay optical system 20.

In the magnified-projection optical system, a projection optical system having a wider angle, namely, a projection optical system with a shorter focal distance is essential to ensure projection on a greater screen or a wide range of dome. This projection optical system requires a longer back focus for the following reasons:

1. The entire size of the display element has been increased as a result of growing density in display element package.
2. A greater power and greater size of the illumination system are essential to meet the demand for a brighter image. For example, use of a reflective display element results in an increase in the size of the portion leading the illumination light to the display element
3. There has been a demand for a so-called three-plate type projector wherein three color display elements are used to obtain a high-definition image and an image is formed from each of the display elements. This requires use of a color-synthesis prism. The size of this color-synthesis prism must be increased to catch up with the trend for growing increase in the size of the display element.

Further, an image of higher definition is required to meet the growing density of display element package. This requires still higher performance of the projection optical system. To achieve the higher performance, the MTF performance must be enhanced. To enhance the MTF performance as well as definition, the chromatic aberration in particular must be reduced. To ensure projection over a wider range, the lateral chromatic aberration in particular should be completely correctly.

However, great difficulties are accompanied in implementing projection optical system characterized by a long back focus and reduced focal distance. To ensure a reduced focal distance and long back focus, a retro-focus type is preferably used To implement a long back focus, the negative optical power of the front group should be enhanced. However, enhanced negative optical power is accompanied by production of greater lateral chromatic aberration.

To solve these problems, the magnified-projection optical system 4 in the embodiment of the present invention is provided with a projection optical system 10, relay optical system 20 and display element 30 arranged in that order as viewed from the screen 1. The image from the display element 30 is subjected to primary image formation by the relay optical system 20. The primarily formed image is enlarged and projected by the projection optical system 10.

As described above, a relay optical system 20 is placed between the projection optical system 10 and display element 30. Thus, despite a long back focus of the entire optical system, a long back focus is provided by the relay optical system 20, whereby the back focus of the projection optical system 10 can be reduced and an increased angle of view can be ensured. This arrangement provides a magnified-projection optical system 4 characterized by a long back focus Fb in the entire optical system despite an increased angle of view.

The projection optical system 10 can be implemented by a short back focus. This arrangement reduces the size in the radial direction of the projection optical system 10 on the side of the screen 1. To put it more specifically, the back focus Fb of the entire optical system is defined as the equivalent length in air on the optical axis from the vertex of surface P3 on the display element 30 side of the lens L27 closest to the display element 30 in the relay optical system 20, to the display element 30.

As described above, the projection optical system 10 is a projection system characterized by a short back focus and an increased angle of view. To ensure projection on a wide angle of view, the negative group G1 having a negative optical power is arranged at a position closest to the screen 1. This arrangement permits projection to be made over a wider range. Further, the projection optical system 10, relay optical system 20 and display element 30 are arranged in that order as viewed from the side of the screen 1. Thus, when light tracing is performed from the side of the screen 1, this arrangement allows the entrance pupil to be arranged closer to the screen than the optical system composed of the projection optical system alone. This structure permits reduction in the effective diameter of the lens located closest to the screen 1. Hence, the size of the optical system in the radial direction is reduced.

The lens of the negative group G1 closest to the screen 1 is characterized by great height of the off-axis light, and gives a serious impact to the off-axis performances such as distortion and lateral chromatic aberration. Thus, the lens closest to the screen 1 in the negative group G1 is preferably made up of a negative meniscus lens having a minimized angle of deflection with respect to the off-axis major light. Further, if the lens closest to the screen 1 in the negative group G1 is made of at least two negative lenses, the negative optical power is dispersed and the occurrence of the aberration can be suppressed.

Lateral chromatic aberration occurs to the lens closest to the screen 1 in the negative group G1. To correct the lateral chromatic aberration, a positive group G2 having the positive optical power is preferably arranged on the primary image forming surface side of the negative group G1 having the negative optical power. The lateral chromatic aberration occurring to the negative group G1 is cancelled out by the lateral chromatic aberration in the direction reverse to that occurring to the positive group G2. This arrangement provides a high-performance magnified-projection optical system 4 characterized by reduced lateral chromatic aberration.

The magnified-projection optical system 4 preferably meets the following conditional expressions (1) and (2).

$$|Fb/F|>10 \quad (1)$$

$$0.5<|F/Fp|<2 \quad (2)$$

wherein Fb is a back focus of the entire optical system including the projection optical system 10 and relay optical system 20, F is a focal distance of the entire optical system, and Fp is a focal distance of the projection optical system 10. The conditional expression (1) defines the length of the back focus Fb. To ensure the back focus, it is necessary to enhance the optical power of the retro-focus negative group of the projection optical system. However, increased lateral chromatic aberration is produced by the enhanced negative group, and correction of the lateral chromatic aberration of the entire optical system becomes difficult. Such problems can be effectively solved by the magnified-projection optical system 4 provided with the relay optical system 20 as an embodiment of the present invention. The conditional expression (1) defines the range wherein the structure using the relay optical system 20 is suited, when constituting the magnified-projection optical system 4 with the lateral chromatic aberration having been corrected. If the conditional expression (1) is met, the lateral chromatic aberration can be suppressed and the projection optical system 10 can be designed in a more compact configuration. It should be added that $|Fb/F|>12$ (1a) is more preferred as the conditional expression (1).

The conditional expression (2) defines the magnification of the relay optical system 20. The F/Fp of the conditional expression (2) indicates the magnification of the relay optical system 20, and represents the ratio of the display element 30 with respect to the primarily formed image of the relay optical system 20. When the magnification of the relay optical system 20 has met the conditional expression (2), the balance is maintained between the brightness of the image projected on the screen 1 and the angle of view.

In the conditional expression (2), when the magnification of the relay optical system 20 is increased, the focal distance Fp of the projection optical system 10 can be increased if the angle of view of the projection optical system 10 remains unchanged. This provides an advantage of the projection optical system 10 and makes it easier to enhance performances. However, to ensure amount of light required by the projection optical system 10, the brightness of the relay optical system 20 must be increased, and the Fno of the relay optical system 20 must be decreased. In the conditional expression (2), in the meantime, if the magnification of the relay optical system 20 is reduced, the Fno of the projection optical system 10 can be increased. This is advantageous. However, the height of the primarily formed image is reduced. To keep the angle of view of the projection optical system 10 unchanged, the focal distance Fp of the projection optical system 10 must be reduced. This is not advantageous to the projection optical system 10 and makes it difficult to enhance performances. The conditional expression (2) provides a trade-off balance between them. If the conditional expression (2) is satisfied, the performance can be enhanced without causing any difficulties in the reduction of the size of the magnified-projection optical system 4.

$0.8<|F/Fp|<1.1$ ... (2a) is more preferred in the conditional expression (2). In this case, the magnification of the relay optical system 20 comes close to 100% rate. This allows the relay optical system 20 to be formed of a symmetrical or approximately symmetrical optical system. Thus, the lateral chromatic aberration and comatic aberration can be reduced. Further, the balance in the brightness between the relay optical system 20 and projection optical system 10 is optimized. The relay optical system 20 can be formed of a symmetric optical system so as to cut down the expenses for procuring and processing the glass material for the lens constituting the relay optical system 20.

Further, the projection optical system 10 and relay optical system 20 are preferred to satisfy the following conditional expression (3):

$$0.3<|Fp/Fm|<3 \quad (3)$$

wherein Fm indicates the focal distance of the negative group G1 of the projection optical system 10. An increase in the angle of view for projection and correction of the distortion are important to the optical power of the negative group G1 located closest to the screen 1 in the projection optical system 10. If the negative group G1 is placed closest to the screen 1, the off-axis major light is bent from the center to the outside. Thus, the greater the optical power, the more advantageous for wide angle. In the meantime, the negative group GI is arranged far away from the stop S1, and this arrangement causes a large negative distortion.

The Fp/Fm of the conditional expression (3) defines the focal distance Fm of the negative group G1 of the projection optical system 10. Thus, if the upper limit of the conditional expression (3) is exceeded, the negative optical power of the negative group G1 is increased to the advantages of wide-angle projection, but distortion and lateral chromatic aberration will be increased. If the lower limit of the conditional expression (3) cannot be reached, in the meantime, the negative optical power of the negative group G1 will be reduced and wide-angle projection cannot be performed. If the conditional expression (3) is satisfied, the distortion and lateral chromatic aberration is suppressed and the wide angle projection can be achieved.

The conditional expression (3) is preferred to be $0.6<|Fp/Fm|<1.5$ ... (3a). If this is satisfied, the distortion and lateral chromatic aberration is suppressed and the wide angle projection can be achieved.

At least one positive lens (L6 through L8 in FIG. 3) of the positive group G2 is preferred to be arranged closer to the screen 1 than where the off-axis major light K2 crosses the optical axis K1 at the position closest to the screen 1.

Further, the projection optical system 10 and relay optical system 20 preferably meet the following conditional expression (4):

$$Yp/Ym>0.8 \quad (4)$$

wherein Yp is the maximum value for light height on the surface of the positive lens resulting from the off-axis paraxial tracing of the major light at a angle of view equivalent to 70 percent of the angle of view on the outermost portion, of the positive lenses (lenses L6 through L8) arranged closer to the screen 1 than where the off-axis major light K2 crosses the optical axis K1 at the position closest to the screen 1, in the positive group G2 of the projection optical system 10; and Ym is the minimum value for light height on the surface of the negative lens resulting from the off-axis paraxial tracing of the major light at a angle of view equivalent to 70 percent of the angle of view on the outermost portion, in the area wherein the negative lens constituting the negative group G1 of the projection optical system 10 is arranged. It should be noted that the height of the major light at an angle of view equivalent to 70 percent of the angle of view on the outermost portion indicates the distance from the optical axis K1 where the major light cross the lens surface.

The positive group G2 preferably contains at least one positive lens meeting the following conditional expression (5):

$$20 < vpm - vpp < 65 \quad (5)$$

wherein vpm is the Abbe's number of the lens having the greatest Abbe's number in the negative group G1 of the projection optical system 10, and vpp is the Abbe's number of the positive lens. To put it another way, the Abbe's number of at least one of the lenses L6 through L8 meets the conditional expression (5).

In the magnified-projection optical system 4 as an embodiment of the present invention, to ensure that the image from the relay optical system 20 is projected by the projection optical system 10, it is preferred to reduce the lateral chromatic aberration of the projection optical system 10 to ensure a high-performance projection image.

The configuration of the present invention does not require a long back focus of the projection optical system 10. Thus, if the positive group G2 is arranged after the negative group G1 located closest to the screen 1 in the projection optical system 10, it is possible to considerably cancel out the lateral chromatic aberration occurring to the negative lens inside the negative group G1 closest to the screen 1 in the projection optical system 10, by means of the positive lens having a positive optical power constituting positive group G2.

To correct chromatic aberration, the chromatic aberration occurring to the negative lens inside the negative group G1 is corrected by the chromatic aberration in the reverse direction which is generated by the positive lens inside the positive group G2. To correct the lateral chromatic aberration, the lateral chromatic aberration occurring to the negative lens closest to the screen 1 in the negative group G1 should be corrected by the positive lens having positive optical power constituting the positive group G2. To achieve this, the direction of the lateral chromatic aberration occurring to the negative group G1 must be made equal to the direction where the lateral chromatic aberration occurs in the direction corrected by the positive lens of the positive group G2. For this purpose, at least one positive lens in the positive group G2 is preferably arranged closer to the screen 1 than where the off-axis major light K2 crosses the optical axis K1. This signifies that the major light passing through the negative group G1 closest to the screen 1 and the major light passing through although one lens of the negative group G1 travel in the same direction with respect to the optical axis K1. This arrangement allows the lateral chromatic aberration to be corrected by at least one positive lens.

To correct the lateral chromatic aberration effectively by the positive group G2, the power of the positive lens should he increased. If the power is increased, the lateral chromatic aberration generated in the reverse direction is generated with respect to the lateral chromatic aberration occurring to the negative lens of the negative group G1, so that the absolute value thereof can be made closer to the lateral chromatic aberration occurring to the negative lens of the negative group G1. The optical system of the present embodiment includes the projection optical system 10 and relay optical system 20 arranged in that order as viewed from the screen 1. This makes it possible to reduce the back focus of the projection optical system 10 when the light is traced from the side of the screen 1. This arrangement allows the optical power of the positive group G2 to be relatively increased, and permits the optical power of the positive lens to be increased. Thus, the composition of the projection optical system 10 and relay optical system 20 is advantageous to the correction of lateral chromatic aberration. However, if the optical power of the positive lens is too strong, impact of the positive power on spherical aberration will be excessive, with the result that high-performances cannot be maintained. There is a limit in increasing the optical power. However, the power at the upper limit is not sufficient to ensure high-performance correction of lateral chromatic aberration. To put it another way, the structure of the projection optical system 10 and relay optical system 20 alone is not sufficient to ensure satisfactory correction of both the lateral chromatic aberration and spherical aberration. To implement the high-performance optical system characterized by reduced lateral chromatic and other aberrations including spherical aberration, the lateral chromatic aberration correction capacity should be enhanced, without the positive optical power being very strong.

Normally, when the optical power remains unchanged, the lens with higher position of light has a greater impact of optical power. To be more specific, even when the optical power of the positive lens is the same, the chromatic aberration correction capacity can be upgraded if the height of light can be increased. $T = \Sigma \phi j / v j \cdot h_1 j \cdot h_2 j \ldots$ (B1) provides a rough indication of the correction of chromatic aberration, wherein $\phi j$ is the power of the j-th lens, $vj$ is the dispersion (Abbe's number) of the material of the j-th lens, and $h_1 j$ and $h_2 j$ are the heights of the on-axis and off-axis light when paraxial light tracing is conducted. According to formula (B1), when paraxial light tracing is conducted, the light at higher position increases the amount of generation of the chromatic aberration even when the optical power is the same. To be more specific, the correction capacity of the lateral chromatic aberration can be enhanced if it is possible to increase the height of the light of the lens having positive power constituting the positive group G2. To put it another way, the lateral chromatic aberration can be corrected to a very small value by arrangement for getting the proper height of the light of the positive lens of the positive group G2 having the positive optical power. Thus, a high-performance optical system can be implemented. The conditional expression (4) defines the height of the light for correction of the lateral chromatic aberration to a proper level. The lateral chromatic aberration is corrected to a very small value by the arrangement for ensuring the conditional expression (4) is satisfied. As described above, the optical system is composed of the projection optical system 10 and relay optical system 20 arranged in that order as viewed from the screen 1 and the projection optical system meets the conditional expression (1) and (2). This arrangement allows the back focus to be reduced when the light is traced from the side of the screen 1 of the projection optical system 10. This implements the configuration meeting the conditional expression (4).

If the lower limit of the conditional expression (4) is exceeded, the height of the off-axis light of the positive lens of the positive group G2 can be ensured, and satisfactory correction of lateral chromatic aberration is ensured. If the value of the conditional expression (4) is smaller, the optical power of the positive lens must be increased. This tends to deteriorate the spherical aberration.

As will be apparent from the formula (B1) providing a rough indication, lens dispersion is important for correction of lateral chromatic aberration. The conditional expression (5) defines the scope of selecting the glass material and the scope of dispersion to optimize the lateral chromatic aberration. To put it more specifically, it defines the Abbe's number of glass. If the upper limit of the conditional expression (5) is exceeded and the Abbe's number of the positive lens is excessively reduced, the cancellation of the chromatic aberration by dispersion will be reduced and the chromatic aberration correction capacity will be reduced. In the meantime, if the lower limit of the conditional expression (5) cannot be reached, and the Abbe's number of the positive lens is excessively increased, the chromatic aberration correction capacity will be increased excessively. Thus, the chromatic aberration correction is optimized if the conditional expression (5) is satisfied.

The relay optical system 20 forms an approximately telecentric optical system on the side of the display element 30. The approximately telecentric optical system preferably meets the following conditional expression (6)

$$|\theta max|<5 \qquad (6)$$

wherein θmax is the maximum angle formed between the normal line of the display element 30 and the major light traveling from the display element 30 to the relay optical system 20. To make an effective use of light coming from the display element 30, the opening of the relay optical system 20 on the display element 30 side should be increased. However, if the opening is increased to excess, the aberration correction will become difficult. Further, the portion in excess of the opening angle of light on the display element 30 side does not contribute to the amount of light to be projected, and is hence wasted. Further, if the off-axis major light on the display element 30 side of the relay optical system 20 is tilted with respect to the display element 30, the opening must be enlarged in order to receive the light from the display element 30, with the result that the size of the relay optical system 20 is increased. Further, if the major light is tilted with respect to the display element 30 in the off-axis area, there will be a decrease in the amount of light entering the on-axis area, with the result that irregularities occur to the entire screen. To avoid this, the relay optical system 20 should be made telecentric on the side of the display element 30.

The conditional expression (6) defines the level of telecentricity. If the conditional expression (6) is satisfied, irregularities in the amount of light and loss of light can be reduced substantially. More preferably, the conditional expression (6) is $|\theta max|<1.5$ ... (6a). This ensures a further reduction in the irregularities in the amount of light and loss of light.

The relay optical system 20 is approximately telecentric on both sides, and this approximately telecentric optical system on both sides preferably meets the following conditional expression (7):

$$|\theta' max|<5 \qquad (7)$$

wherein θ'max is the maximum angle formed between the normal line of the surface wherein an image is primarily formed, and the main light passing through the surface wherein an image is primarily formed, from the side of the display element 30.

The approximately telecentric optical system on both sides (relay optical system 20) preferably meets the following conditional expression:

$$|\phi r \times Tr|<0.2 \qquad (8)$$

wherein φr is the optical power of the relay optical system 20, and Tr is the distance from the vertex of surface P2 on the screen 1 side of the lens L16 closest to the screen 1 in the relay optical system 20, to the vertex of surface P3 on the display element 30 of the lens L27 located closest to the screw 1 (without including such a prism such as a color-synthesis prism).

The relay optical system 20 side of the projection optical system 10 is made telecentric, and the opening of the relay optical system 20 on the screen 1 side is made the same as the opening of the projection optical system 10 on the relay optical system 20 side. This arrangement ensures an effective transfer of light from the relay optical system 20 to the projection optical system 10. When the magnification rate of projection is to be changed, the zoomed optical system should be used in normal cases.

However, when the magnification rate of project is to be changed substantially, the zoomed optical system will inevitably become very large in size and very expensive, if the opening of the projection optical system 10 on the relay optical system 20 side is kept unchanged. In this case, in the projection optical system 10, a plurality of unifocal optical systems which are telecentric and which have the same openings of the projection optical system 10 on the relay optical system 20 side and different focal distances are prepared, and the projection optical system 10 is exchanged. When this arrangement is made, the magnification rate for projection can be changed at a reduced cost with the minimum loss in the amount of light.

This structure permits the projection optical system 10 to be exchanged as an optical system having a plurality of focal distances, and ensures a satisfactory trade-off relationship between the cost and performance.

The conditional expression (7) together with the conditional expression (6) defines the level of double telecentricity of the relay optical system 20. If the conditional expression (7) is met, irregularities and loss in the amount of light can be reduced substantially. The conditional expression (7) is preferably $|\theta' max|<1.5$ ... (7a). This ensures a further reduction in the irregularities and loss in the amount of light.

The conditional expression (8) defines the double telecentricity of the relay optical system. To make the projection optical system 10 replaceable, the conditional expression (8) should be satisfied. Then variations in production with respect to the level of telecentricity of the projection optical system 10 can be kept within the normal scope, and less costly production of the projection optical system 10 can be achieved without having to increase the production cost thereof. The Tr is the distance from the vertex of surface P2 on the screen 1 side of the lens L16 closest to the screen 1 in the relay optical system 20, to the vertex of surface P3 on the display element 30 side of the lens L27 on the side of the display element 30. The conditional expression (8) is preferably $|\phi r \times Tr|<0.05$ ... (8a). This ensures less costly production of the projection optical system 10 to be achieved without having to increase the production cost thereof.

The angle of view of the entire optical system preferably meets the following conditional expression (A1):

$$240 \text{ degrees} > W > 100 \text{ degrees} \qquad (A1)$$

wherein W is the angle of view of the entire optical system.

When an image is projected on the screen, a greater angle of view provides better projection. The image can be projected in a more enlarged size when the display element size remains unchanged. An image projected in a more enlarged size enhances presence. Further, a shorter projection distance can be used when the same projection magnification rate is required. This ensures an effective use of space. In these respects, a wider angle of view is preferred. However, if an attempt is made to project the same display element at a wider view of angle, a shorter focal distance will be required. If an attempt is made to form an optical system at a shorter focal distance, it will become difficult to ensure the performances from the mid- to final-regions. If higher performances are to be obtained, the number of the lenses will have to be increased or a greater optical system size must be used, with the result that production costs will be increased. Thus, a proper value should be selected for the angle of view of the entire optical system, and preferably, the conditional expression (A1)

should be satisfied. When an image is projected on a dome-like screen, the angle of view is preferably close to 180 degrees. When an image is to be projected on the dome-like screen with one piece, the upper limit of the conditional expression (A1) is preferably 200 degrees if the curvature of the lens L1 closest to the screen 1 in the projection optical system 10 is considered from the viewpoint of product cost and processability.

The angle of view of the projection optical system 10 preferably meets the following conditional expression (A2).

$$240 \text{ degrees} > Wp > 100 \text{ degrees} \quad (A2)$$

wherein the conditional expression (A2) defines the angle of view of the projection optical system 10 required to satisfy the aforementioned conditional expression (A1). The lower limit of the conditional expression (A2) is preferably 140 degrees, more preferably 155 degrees.

Further, a fisheye lens optical system is preferably used as a projection optical system 10. More preferably, an equi-distance projection system (f·θ) should be used.

For example, when an image is projected on the whole-sky screen, the angle of view of about 150 degrees or more is required. In this case, a fisheye optical system is preferably used as the projection optical system 10. Adoption of the fisheye optical system permits projection on a wider area such as the whole sky. Further, if the distance on the display element 30 is proportional to the distance on the screen 1 in projection, use of the equi-distance projection system (f·θ) ensures more natural projection when the display element 30 is projected on the screen such as a dome.

The position of the entrance pupil of the projection optical system 10 and the overall length of the projection optical system 10 preferably meet the following conditional expression (A3):

$$Le/TLp > 0.02 \quad (A3)$$

wherein Le indicates the distance from the vertex of surface of the lens L1 closest to the screen 1 in the projection optical system 10, to the entrance pupil when the light is traced from the screen 1 of the projection optical system 10 toward the display element 30; and TLp is the overall distance of the projection optical system 10 (from the vertex of surface of the lens L1 closest to the screen 1 in the projection optical system 10, to the vertex of surface of the lens L15 closest to the relay optical system 20).

The conditional expression (A3) defines the position of the entrance pupil of the projection optical system 10. The optical system of the present embodiment includes the projection optical system 10 and relay optical system 20. It is configured in such a way that the primary image distance of the projection optical system 10 and the object point position of the projection optical system 10 on the side of the screen 1 are almost the same. A long back focus must be provided in the normal projection optical system wherein a relay optical system is not used and a primary image point is not created. However, in the case of the present embodiment wherein a relay optical system 20 is employed, the projection optical system 10 does not require such a long back focus. Thus, the position of the entrance pupil can be set close to the display element 30. Accordingly, if the conditional expression (A3) is met, the position of the light from the optical axis of the lens L1 can pass through a lower position, wherein this light is emitted from the lens L1 closest to the screen 1. This makes it possible to reduce the effective diameter of the lens L1 closest to the screen 1. It should be noted that the conditional expression (A3) is preferably Le/TLp>0.1 . . . (A3a), more prefer-ably Le/TLp>0.15 . . . (A3b). If this is satisfied, it is possible to further reduce the effective diameter of the lens L1 closest to the screen 1.

The effective diameter of the lens L1 closest to the screen 1 in the projection optical system 10 and the focal distance of the projection optical system 10 preferably meet the following conditional expression (A4):

$$D1/Fp < 40 \quad (A4)$$

wherein D1 is the effective diameter of the lens L1 closest to the screen 1 in the projection optical system 10, and Fp is the focal distance of the projection optical system 10.

When the conditional expression (A3) is satisfied as described above, the entrance pupil can be placed closer to the screen 1 and the light from the optical axis of the light can pass through a lower position, wherein this light is emitted from the lens L1 closest to the screen 1. This allows the effective diameter of the lens L1 closest to the screen 1 to be reduced. The conditional expression (A4) defines the effect thereof. If the lower limit of the conditional expression (A3) cannot be reached, and the entrance pupil is located closer to the primary image side, the effective diameter of the lens L1 closest to the screen 1 will be increased excessively. Thus, the lens L1 will be so large that processing is difficult and the cost is very high.

Thus, when the conditional expression (A3) is satisfied, the effective diameter of the lens L1 closest to the screen 1 can be reduced. The conditional expression (A4) is preferably D1/Fp<20 . . . (A4a).

The distance from the vertex of surface of the lens L15 closest to the relay optical system 20 in the projection optical system 10, to the primary image (back focus of the projection optical system 10), and the focal distance of the projection optical system 10 preferably meet the following conditional expression (A5).

$$10 > Fbp/Fp > 0.5 \quad (A5)$$

wherein Fbp is the distance from the vertex of surface closest to the relay optical system 20 in the projection optical system 10, to the primary image, and Fp is the focal distance of the projection optical system 10.

If the height of the primary image remain unchanged, the focal distance Fp of the projection optical system 10 must be reduced in order to project the image on a wider angle of view. When the back focus Fbp of the projection optical system 10 remains unchanged, high-performances cannot be easily ensured if the focal distance is reduced. This is because of the following reason: When the retrofocus is adopted in the projection optical system in order to ensure a long back focus with respect to the focal distance, a highly negative optical power must be provided on the side of the screen 1. This causes the projection optical system 10 to assume a more asymmetrical configuration. However, if this distance is too short, for example, such a member as a stop for a field of view or flare cutter cannot be easily placed at the position of the primary image, with the result that the cost will have to be increased. Thus, the back focus Fbp of the projection optical system 10 is preferably set so as to meet the conditional expression (A5). The conditional expression (A5) is preferably 5>Fbp/Fp>2 . . . (A5a).

An approximately telecentric optical system is located on the primary image side of the projection optical system 10. This approximately telecentric optical system preferably satisfies the following conditional expression (A6):

$$|\theta''\text{max}| < 5 \quad (A6)$$

wherein θ" max is the maximum angle formed between the normal line of the surface wherein an image is primarily formed, and the main light passing through the surface wherein an image is primarily formed, from the side of the display element 30.

The conditional expression (A6) defines the both-side approximately telecentric optical system of the projection optical system 10. Similarly to the case of the conditional expressions (6) and (7), the relay optical system 20 side of the projection optical system 10 is made telecentric, and the opening of the relay optical system 20 on the side of the screen 1 is made the same as the opening of the projection optical system 10 on the side of the relay optical system 20. This arrangement ensures effective transmission of light from the relay optical system 20 to the projection optical system 10. Further, a plurality of unifocal optical systems which have the same openings of the projection optical system 10 on the relay optical system 20 side and different focal distances are prepared, and the projection optical system 10 is exchanged. When this arrangement is made, the projection optical system 10 as an optical system having a plurality of zooming ratio can be changed so that a trade-off relationship between cost and performance is maintained. Thus, irregularities and loss in the amount of light can be reduced substantially if the conditional expression (A6) is satisfied.

The focal distance of the negative lens L1 closest to the screen 1 in the negative group G1 of the projection optical system 10 and the focal distance of the projection optical system 10 preferably satisfy the aforementioned conditional expression (A7).

$$100 > |Fpm/Fp| > 2 \tag{A7}$$

wherein Fpm is the focal distance of the negative lens L1 closest to the screen 1 in the negative group G1 of the projection optical system 10, and Fp is the focal distance of the projection optical system 10.

Further, the negative lens L1 closest to the screen 1 in the negative group G1 of the projection optical system 10 is preferably a meniscus lens conveyed toward the screen 1 and belongs preferably to the spherical surface system.

The conditional expression (A7) defines the negative optical power of the negative lens L1 closest to the screen 1 in the negative group G1 of the projection optical system 10. If the lens closest to the screen 1 is a lens having a positive optical power, the effective diameter will be increased too much although distortion problem can be solved. If the negative optical power of this lens is high, advantages can be obtained by increasing the projected angle of view. However, if the optical power becomes excessive, the negative distortion and lateral chromatic aberration will be excessive. Thus, the negative distortion and lateral chromatic aberration can be suppressed if the conditional expression (A7) is satisfied. When a meniscus lens convexed toward the screen 1 is used as the negative lens L1, it is possible to suppress astigmatism and distortion effectively when the optical power is kept unchanged. Further, since the projection optical system 10 is a wide-angle optical system, the diameter of the negative lens L1 can be relatively increased. Thus, production accuracy can be ensured by processing in a spherical system. It should be noted that the conditional expression (A7) is preferably $$50 > |Fpm/Fp| > 5 \tag{A7a}.$$

The focal distances of the front and rear groups of the relay optical system 20 preferably satisfy the following conditional expression (A8):

$$2 > |Frf/Frr| > 0.5 \tag{A8}$$

wherein Frf is the focal distance of the front group of the relay optical system 20, and Frr is the focal distance of the rear group of the relay optical system 20.

To form a high-performance optical system, the relay optical system 20 is preferably as symmetric as possible. For this purpose, asymmetric configuration should be avoided whenever possible. The conditional expression (A8) represents collapse of the symmetry in the configuration of the relay optical system 20. When the conditional expression (A8) is satisfied, the symmetry and a tradeoff relationship of the optical power between the front and rear groups can be maintained. Correction of the lateral chromatic aberration is facilitated. It should be noted that the conditional expression (A8) is preferably $1.2 > |Frf/Frr| > 0.8 \ldots$ (A8a).

The focal distance of the negative lens closest to the display element 1 in the relay optical system 20 and the focal distance of the entire optical system preferably satisfy the following conditional expression (A8):

$$2 > |Frm/F| > 0.5 \tag{A9}$$

wherein Frm is the focal distance of the negative lens closest to the display element 1 in the relay optical system 20, and F is focal distance of the entire optical system.

The conditional expression (A9) defines the optical power of the negative lens closest to the display element 1 in the relay optical system 20. The negative lens closest to the display element 1 in the relay optical system 20 does not mean that this lens is located closest to the screen 1 in the relay optical system 20. A positive lens can be placed on the screen 1 side of this negative lens. An approximately telecentric system on both sides is preferably used as the relay optical system 20. To get a telecentric system, a lens having a powerful negative power capable of leading light to a high position must be placed at some midpoint. However, if the optical power of this lens is excessive, the image surface will be excessively corrected. In the meantime, the optical power of this lens is too weak the lens must be placed at a high position in order to ensure sufficient telecentricity. This requires a large space, with the result that the overall length of the relay optical system 20 must be increased. Thus, if the conditional expression (A9) is satisfied, telecentricity can be obtained effectively and Petzval correction can be performed effectively, so that a compact relay optical system can be implemented.

The Abbe's number of the negative lens closest to the display element 30 in the relay optical system 20 preferably meets the following conditional expression (A10).

$$55 > vrm > 20 \tag{A10}$$

wherein vrm is the Abbe's number of the negative lens closest to the display element 30 in the relay optical system 20.

The conditional expression (A10) defines the dispersion of the negative lens closest to the display element 30 in the relay optical system 20. To ensure high performances, chromatic aberration must be very small. Thus, the negative lens is required to have a certain level of dispersion. Otherwise, the chromatic aberration occurring to the positive lens cannot be corrected. If the dispersion is reduced so that the upper limit of the conditional expression (A10) is exceeded, the chromatic aberration correction capacity will be reduced. If dispersion is increased so that the lower limit of the conditional expression (A10) cannot be reached, the chromatic aberration correction capacity will be increased to the level more than necessary. Thus, if the conditional expression (A10) is met, proper chromatic aberration correction can be implemented. It should be noted that the conditional expression (A10) is preferably $55 > vim > 35 \ldots$ (A10a).

Preferably, the relay optical system 20 is equipped with at least two low-dispersion lenses and the following conditional expression (A11) and (A12) are satisfied:

$$120 > vdr > 65 \quad (A11)$$

$$Pgfr < 0.55 \quad (A12)$$

wherein vdr is a Abbe's number of the low-dispersion lens in the relay optical system 20, and Pgfr is the secondary dispersion of the low-dispersion lens in the relay optical system 20.

To form a high-performance optical system, it is preferred to adopt such a configuration as to reduce the chromatic aberration. To reduce the chromatic aberration, low-dispersion glass is used for the positive lens, whereby the chromatic aberration can be corrected to a low level. Further, the secondary chromatic aberration is preferably corrected. To achieve this, the positive lens is preferably made of anomalous dispersion glass. However, this glass is somewhat more expensive than the normal glass. Thus, advantages conforming to the cost will be obtained by giving more cost-effective consideration. This glass is more subjected to geometrical changes due to temperature change than the normal glass. This will increase a change in performances. For these reasons, the number of lenses used is at least two, preferably six, more preferably eight or even more.

The conditional expression (A11) defines the degree of dispersion of this lens. If the lower limit of the conditional expression (A11) cannot be reached, the degree of dispersion will be excessive and chromatic aberration correction capacity will be deteriorated. If a material exceeds the upper limit of the conditional expression (A11), such a material is an unknown one and is predicted to be very expensive. Thus, if the conditional expression (A11) is met, proper chromatic aberration correction can be achieved.

The conditional expression (A12) defines the anomalous dispersion of this lens. If the upper limit of the conditional expression (A12) is exceeded, the anomalous dispersion is reduced and satisfactory correction of the secondary chromatic aberration cannot be achieved. Thus, when the conditional expression (A12) is satisfied, the satisfactory correction of the secondary chromatic aberration cannot be achieved.

The distance from the primary image formation point of the relay optical system 20 to the display element 30 and overall length of the entire optical system preferably meet the following conditional expression (A13).

$$0.8 > TLr1/TL > 0.4 \quad (A13)$$

wherein TLr1 is the distance from the primary image formation point of the relay optical system 20 to the display element 30, and TL is the overall length of the entire optical system (wherein actual dimensions are used for the prism without being converted into the equivalent length in air).

The distance from the vertex of surface P2 of the lens L16 closest to the screen 1 in the relay optical system 20 to the vertex of surface P3 of the lens L27 closest to the display element 30 preferably meets the following conditional expression (A14).

$$0.6 > TLr2/TL > 0.05 \quad (A14)$$

wherein TLr2 is the distance from the vertex of surface P2 of the lens L16 closest to the screen 1 in the relay optical system 20 to the vertex of surface P3 of the lens L27 closest to the display element 30, and TL is the entire optical system of the entire optical system (wherein actual dimensions are used for the prism without being converted into the equivalent length in air).

The distance from the primary image formation point of the relay optical system 20 to the display element 30, and the distance from the vertex of surface P2 of the lens L16 closest to the screen 1 in the relay optical system 20, to the vertex of surface P3 of the lens L27 closest to the display element 30 preferably meet the following conditional expression (A15):

$$0.8 > TLr2/TLr1 > 0.2 \quad (A15)$$

wherein TLr1 is a distance from the primary image formation point of the relay optical system 20 to the display element 30, and TLr2 is a distance from the vertex of surface P2 of the lens L16 closest to the screen 1 in the relay optical system 20.

To ensure a compact configuration of the entire optical system, the overall length of the relay optical system 20 must be suppressed. The conditional expressions (A13) through (A15) provide a rough indication thereof. If the value is excessive, the percent of the area occupied by the relay optical system 20 in the entire optical system will be increased. If the size of the entire optical system is to be included in the target, the size of the projection optical system 20 must be reduced. This will make it difficult to correct the aberration of the relay optical system 20 and high-performance cannot be achieved easily. Further, if the relay optical system 20 is reduced in size so that the lower limits of the conditional expressions (A13) through (A15) cannot be reached, it will be difficult to correct aberration in the relay optical system 20, with the result that high-performance cannot be achieved. Thus, when the conditional expressions (A13) through (A15) are satisfied, balanced and appropriate correction of chromatic aberration can be achieved in both the projection optical system 20 and relay optical system 20. Thus, high performances can be achieved. It should be noted that the conditional expression (A13) is preferably $0.7 > Thr1/TL > 0.5$ ... (A13a), and the conditional expression (A14) is preferably $0.4 > TLr2/TL > 0.1$ ... (A14a). The conditional expression (A15) is preferably $0.6 > TLr2/TL1 > 0.3$ ... (A15a).

The projection optical system 10 includes a negative meniscus lens, negative meniscus lens and negative lenses (L1 through L14) arranged in that order as viewed from the screen 1. It is preferred to adopt a structure equipped with two, more preferably, three lenses (L11, L12, L14 and L15) having a positive optical power including the cemented lens on the side of the display element 30 in the stop S11.

If a negative meniscus lens, negative meniscus lens and negative lenses (L1 through L4) are arranged in that order as viewed from the screen I, the astigmatism, distortion and lateral chromatic aberration can be effectively corrected. The comatic aberration can be corrected and telecentricity can be ensured effectively by adopting a structure equipped with two, more preferably, three lenses (L11, L12, L14 and L15) having a positive optical power including the cemented lens on the side of the display element 30 in the stop S1.

It is preferred that the relay optical system 20 should be approximately symmetric and the relay magnification rate should be 100%.

When the magnification rate of the relay optical system 20 is 100% and a symmetric structure is adopted, the comatic aberration and lateral chromatic aberration can be reduced. Further, many advantages can be provided. For example, stabilization of the components and cutdown of the production cost can be achieved.

The relay optical system 20 is arranged in the order of positive, negative, positive, negative, positive, negative and positive. Preferred is the positive, positive, negative, positive, positive, negative, negative, positive, positive, negative, positive and positive arrangement in that order as viewed from the screen 1.

If positive lenses (L16 and L27) are arranged at the position closest to the screen 1 in the relay optical system 20 and at the position closest to the display element 30, respectively, telecentricity can be easily obtained. When negative lenses (L21 and L22) are provided in the front and rear groups respectively, telecentricity can be ensured and the Petzval correction can be performed effectively, with the result that a compact configuration of the relay optical system 20 can be obtained.

It is preferred that the projection optical system 10 should be made of 13 lenses (where the number of cemented lenses is counted after separating them into each single lens), and the relay optical system 20 should be made of 12 lenses.

To form a high-performance optical system, the number of lenses used is preferably increased. However, if the number of lenses is excessive, the transmittance will be deteriorated by reflection on the surface of each lens, the system cannot be put into commercial use. Accordingly, as described above, the numbers of the lenses in the projection optical system 10 and relay optical system 20 should be designed approximately the same with each other.

The major light having the maximum angle of view passing through at least one positive lens in the positive group G2 of the projection optical system 10, and the major light having the maximum angle of view passing through the lens closest to the screen 1 in the negative group G1 of the projection optical system 10 preferably travel in the same direction with respect to optical axis, and preferably meet the following conditional expression (B1):

$$0.8 > \phi Rp/\phi Rn > 0.3 \quad (B1)$$

wherein $\phi Rp$ is the maximum of the effective diameters of the positive lens of the positive group G2 in the projection optical system 10, and $\phi Rn$ is the effective diameter on the screen 1 side of the negative lens closest to the screen 1 in the projection optical system 10.

Further, the maximum of the effective diameters of the positive lens in the positive group G2 of the projection optical system 10, and the focal distance of at least one positive lens in the positive group G2 of the projection optical system 10 preferably meet the following conditional expression (B2):

$$4 > \phi Rp/fp > 0.05 \quad (B2)$$

wherein $\phi Rp$ is the maximum of the effective diameters of the positive lens of the positive group G2 in the projection optical system 10, and $\phi fp$ is the focal distance of at least one positive lens in the positive group G2 of the projection optical system 10.

To obtain a high-performance image projection, careful correction of the aberrations is essential. In particular, reduction of the chromatic aberration is essential to minimize bleeding of color in the colored video image and to ensure high resolution. The conditional expression (B1) defines the optimum conditions for ensuring effective correction of the chromatic aberration, particularly the lateral chromatic aberration. It should be noted that the following description assumes that light enters the screen 1 to travel toward the display element 30.

Normally, chromatic aberration is corrected by mutual cancellation between the chromatic aberrations in the reverse directions occurring to positive lens and negative lens. The lateral chromatic aberration is also corrected in the similar manner. It is necessary to take into account the direction of the passing off-axis light with respect to the on-axis light. If the off-axis light travels in the same direction with respect to the optical axis, the lateral chromatic aberration occurring to the negative lens can be corrected by the lateral chromatic aberration occurring in the reverse direction due to the positive lens. The generation of the lateral chromatic aberration is normally greater when the optical power is greater. Accordingly, the optical power of the positive lens in the positive group G2 should be increased in order to correct the lateral chromatic aberration produced by the negative lens closest to the screen 1 in the negative group G1. To put it another way, if the optical power of this positive lens is increased, the lateral chromatic aberration can be effectively corrected. The structure of the present invention consisting of the projection optical system 10 and relay optical system 20 permits reduction of the back focus Fbp in the projection optical system 10, as described above. The optical power of the positive lens in the positive group G2 can be relatively increased. However, if the optical power is excessive, other aberrations, especially spherical aberration and astigmatism, will be increased and the image performance will be deteriorated. This requires the optical power to be set to a proper level.

If the off-axis light travels in the direction reverse to the optical axis, the direction of the lateral chromatic aberration differs even when the same positive lenses are used. In the projection optical system 10 of the present embodiment, a very wide angle of view must be provided. In the basic configuration, the projection optical system 10 adopts the so-called retro-focus type having a negative optical power on the side of the screen 1 and a positive optical power on the side of the display element 1. To correct other aberrations such as spherical aberration and astigmatism, a stop P1 is provided in the midway of the optical system so that the optical power is provided on the side of the display element 30. Then the direction of the lateral chromatic aberration occurring to the positive lens closer to the display element 30 than the stop P1 is different from the direction of the lateral chromatic aberration occurring to the positive group G2 located before the stop P1. The off-axis light of the positive lens closer to the display element 30 than the stop P1 has an off-axis light in the direction reverse to that of the negative lens on the display element 1 side. Thus, the positive lens located closer to the display element 30 than the stop P1 generates the chromatic aberration in the direction of increasing the lateral chromatic aberration that occurs to the negative lens closest to the display element 1 in the negative group G1. Accordingly, in order to ensure effective correction of the lateral chromatic aberration of the projection optical system 10, a high level of reverse lateral chromatic aberration must be produced using the direction wherein the off-axis light passes through the negative lens closest to the display element 1 with respect to the on-axis light, and at least one positive lens of the positive group G2 wherein the off-axis light in the same direction therewith passes.

On-axis chromatic aberration must also be corrected. Generally, the direction in which on-axis chromatic aberration occurs in the same direction for a positive lens. To be more specific, the on-axis chromatic aberrations occurring to the positive lenses before and after the stop P1 with respect to the screen 1 are in the same direction, as in the case of the lateral chromatic aberration. Thus, if the optical power of this positive lens is increased to an excess, a heavy on-axis chromatic aberration will be produced, and a high-performance projected image cannot be obtained.

This requires a method for correcting the lateral chromatic aberration more effectively. In the case of a lens having the same optical power and the same dispersion, the light crossing the lens surface at a position farther away from the optical axis is accompanied by a greater amount of lateral chromatic aberration. If the effective diameter $\phi Rp$ of the positive lens is increased, the off-axis light is allowed to pass through the position farther away from the optical axis K1, with the result that there will be an increase in the generation of the lateral chromatic aberration in this positive lens.

Several methods are available to increase the effective diameter φRp. For example, if a negative lens having a very high optical power is arranged closest to the display element 30 in the negative group G1 or closest to the screen 1 in the positive group G2, the off-axis light entering the positive lens can be shifted away from the optical axis K1. This allows the effective diameter φRp of the positive lens to be increased. Further, if a negative meniscus lens concaved to the screen 1 is used instead of this negative lens, the effective diameter φRp of the positive lens can be increased without having to increase the negative optical power very much. In any way, the effective diameter φRp of the positive lens can be increased. This ensures more effective correction of the lateral chromatic aberration.

The conditional expression (B1) defines the effective diameter φRp, and provides a very effective way of correcting the lateral chromatic aberration. Especially, this expression defines the effective diameter φRp of this positive lens with respect to the effective diameter φRn of the negative lens closest to the screen 1. It provides the conditions for correcting the lateral chromatic aberration more effectively by this positive lens, wherein this lateral chromatic aberration is produced by the negative group G1 closest to the screen 1. If the lower limit of the conditional expression (B1) cannot be reached and the effective diameter φRp is small, satisfactory correction of the lateral chromatic aberration cannot be achieved. Further, when the upper limit is exceeded and the effective diameter φRp of the positive lens is increased to excess, the lateral chromatic aberration on the periphery will be excessively corrected and heavy astigmatism will occur. High-performance projection image cannot be obtained in any way. Thus, when the conditional expression (B1) is satisfied, optimization will be made to correct the lateral chromatic aberration and astigmatism. It should be noted that the conditional expression (B1) is preferably 0.7>φRp/φRn>0.4 . . . (B1a).

When the lateral chromatic aberration is corrected by the positive lens of the positive group G2, it is preferred to use the method of increasing the effective diameter φRp and the method of increasing the optical power of the positive lens. Effective aberration correction and superb processability can be ensured by optimizing the relationship between the optical power of the positive lens and effective diameter φRp, without either of them being excessively increased. The conditional expression (B2) defines the relationship between the optical power of the positive lens and effective diameter φRp, wherein focal distance is used as optical power. If the lower limit of the conditional expression (B2) cannot be reached and the focal distance fp of the positive lens is increased, namely, if the optical power is reduced and the effective diameter φRp is increased excessively, the size of the lens must be increased. This deteriorates processability and causes excessive occurrence of astigmatism and others on the periphery. If the lower limit cannot reached and the focal distance fp is short, namely, if the optical power of the positive lens is increased excessively, the curvature of the lens will be sharp and the size of astigmatism and other aberration will be increased. Further, processability will be deteriorated. If the conditional expression (B2) is satisfied, effective correction of the aberration and suburb processability can be ensured. It should be noted that the conditional expression (B2) is preferably 2>φRp/fp>0.2 . . . (B2a).

As described above, if the magnified-projection optical system 4 is designed to have the aforementioned structure, the back focus is long enough to cope with an increase in the size of the display element and illumination system, and to allow a wide-angle video image to be projected. Further, the chromatic aberration can also be reduced, with the result that a high-performance digital type planetarium device can he implemented.

EXAMPLE

Example 1

The following describes the first Example of the magnified-projection optical system of the present invention: The structure of the first Example is the same as those of FIGS. 2 through 4.

The following shows the construction data of each lens in the first Example:

| Numerical value of Example 1 | | | | |
|---|---|---|---|---|
| Unit: mm Surface data | | | | |
| Surface number: | r | d | nd | vd |
| Screen: | | 6250.000 | | 6250.00 |
| 1 | 116.336 | 6.00 | 1.51680 | 64.20 |
| 2 | 43.902 | 13.95 | | |
| 3 | 110.039 | 3.34 | 1.62041 | 60.34 |
| 4 | 26.322 | 14.45 | | |
| 5 | 363.038 | 2.60 | 1.65844 | 50.85 |
| 6 | 23.891 | 14.50 | | |
| 7 | −26.799 | 2.30 | 1.74400 | 44.90 |
| 8 | −82.792 | 12.05 | | |
| 9 | −52.611 | 2.23 | 1.80518 | 25.46 |
| 10 | 457.099 | 1.60 | | |
| 11 | 554.594 | 10.80 | 1.60342 | 38.01 |
| 12 | −35.417 | 0.20 | | |
| 13 | 2085.784 | 6.15 | 1.60342 | 38.01 |
| 14 | −69.000 | 0.20 | | |
| 15 | 50.030 | 7.60 | 1.51680 | 64.20 |
| 16 | −498.560 | 31.30 | | |
| 17 | 13.444 | 2.30 | 1.75520 | 27.53 |
| 18 | 10.311 | 10.40 | | |
| 19 | (stop) | ∞ | 1.80 | |
| 20 | −141.634 | 1.86 | 1.74400 | 44.90 |
| 21 | 16.011 | 2.83 | 1.51680 | 64.20 |
| 22 | −31.425 | 8.02 | | |
| 23 | 28.164 | 5.00 | 1.49700 | 81.61 |
| 24 | −25.092 | 0.25 | | |
| 25 | −194.558 | 2.40 | 1.80610 | 40.73 |
| 26 | 20.703 | 2.60 | | |
| 27 | 38.207 | 4.90 | 1.49700 | 81.61 |
| 28 | −32.563 | 0.40 | | |
| 29 | 39.116 | 5.50 | 1.49700 | 81.61 |
| 30 | −43.053 | 19.25 | | |
| 31 | (dummy) | 91.51 | | |
| 32 | 90.371 | 10.50 | 1.49700 | 81.61 |
| 33 | −77.948 | 3.50 | | |
| 34 | 76.255 | 7.80 | 1.49700 | 81.61 |
| 35 | −186.743 | 5.00 | | |
| 36 | −58.600 | 5.20 | 1.74330 | 49.22 |
| 37 | 108.622 | 1.20 | | |
| 38 | 67.212 | 10.40 | 1.49700 | 81.61 |
| 39 | −60.485 | 0.30 | | |
| 40 | 34.255 | 8.50 | 1.497008 | 1.61 |
| 41 | 191.463 | 9.40 | | |
| 42 | −314.203 | 6.70 | 1.56883 | 56.04 |
| 43 | 18.876 | 7.58 | | |
| 44 | (dummy) | 7.58 | | |
| 45 | −18.876 | 6.70 | 1.56883 | 56.04 |
| 46 | 314.203 | 9.40 | | |
| 47 | −191.463 | 8.50 | 1.49700 | 81.61 |
| 48 | −34.255 | 0.30 | | |
| 49 | 60.485 | 10.40 | 1.49700 | 81.61 |
| 50 | −67.212 | 1.20 | | |
| 51 | −108.622 | 5.20 | 1.74330 | 49.22 |
| 52 | 58.600 | 5.00 | | |

-continued

Numerical value of Example 1

| 53 | 186.743 | 7.80  | 1.49700 | 81.61 |
| 54 | −76.255 | 3.50  |         |       |
| 55 | 77.948  | 10.50 | 1.49700 | 81.61 |
| 56 | −90.37  | 12.00 |         |       |
| 57 | ∞       | 60.00 | 1.51680 | 64.20 |
| 58 | ∞       | 50.00 |         |       |

Display element ∞
Various forms of data
Major wavelength: 546 nm (620 nm 546 nm 460 nm)
Fl (fbcallength): −5.73
Fno.: 3.2
Angle of view: 160°
Conditional expression
(1) |Fb/F|: 15.97
(2) |F/Fp|: −1.0
(3) |Fp/Fml|: L1-L4: −0.63
(4) Yp/Ym: 1.27
(5) vpm-vpp: 26.3
(6) |θmax|: 0.3
(8) |φr × Tr|: 0.032
(A1) 240 degrees > W > 100 degrees:160 degrees
(A2) 240 degrees > Wp > 100 degrees:160 degrees
(A3) Le/TLp > 0.02:0.2
(A4) Dl/Fp < 40:17.9
(A5) 10 > Fbp/Fp > 0.5:3.4
(A7) 100 > |Fpm/Fp| > 2:24.4
(A8) 2 > |Frf/Frr| > 1:1
(A9) 2 > |Frm/F| > 0.5:8.8
(A10) 55 > vrm > 20:49.2
(A11) 120 > vdr > 65:81.6
(A12) Pgfr < 0.55:0.5
(A13) 0.8 > TLr1/TL > 0.4:0.64
(A14) 0.6 > TLr2/TL > 0.05:0.28
(A15) 0.8 > TLr2/TLr1 > 0.2:0.43
(B1) φRp/φRn: 0.47
(B2) φRp/fp: 0.44

In FIGS. 3 and 4, the number ri (i=1, 2, 3, . . . ) assigned to each lens surface denotes the i-th lens surface when counted from the screen 1 (wherein the cemented surfaces of the lenses are counted as one surface).

Figure 5A:
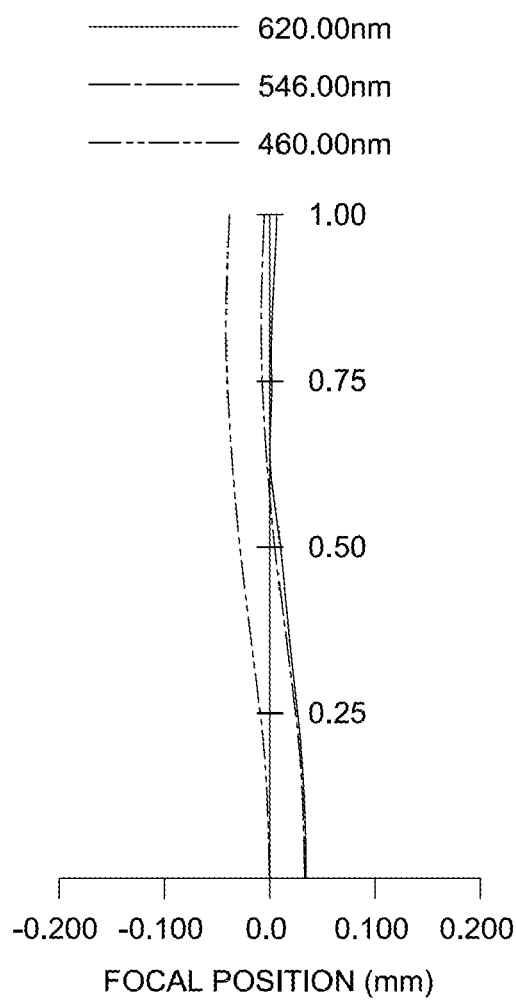
FIGS. 5a and 5b are aberration diagrams in the first embodiment.
Figure 5B:
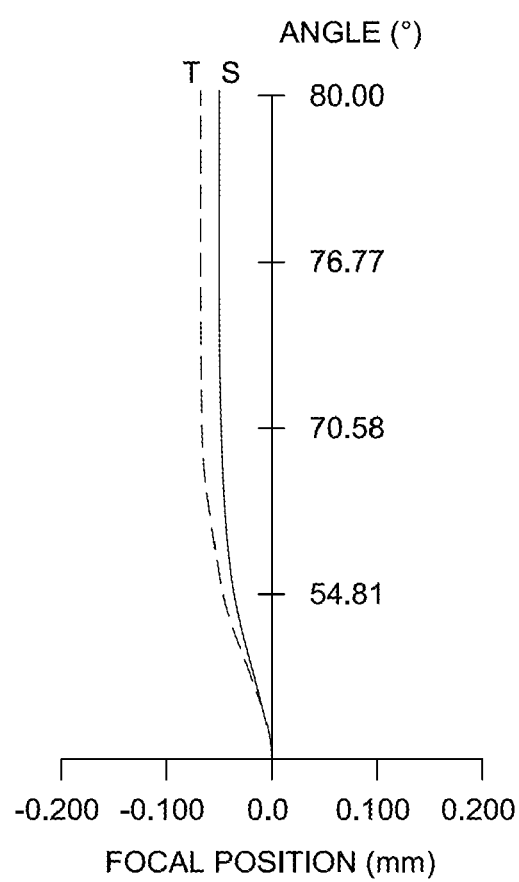
Figure 6:
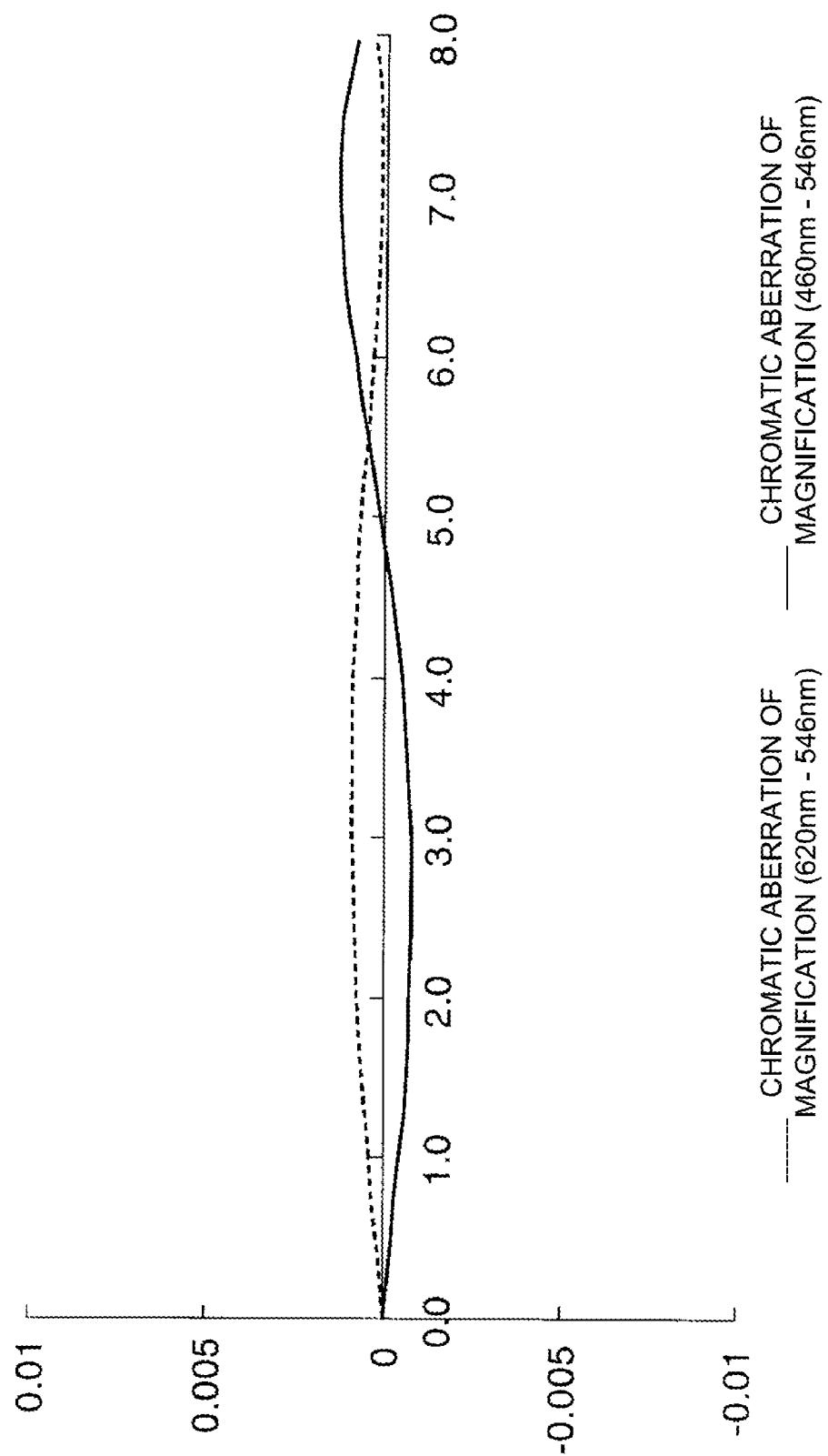
FIG. 6 is a lateral chromatic aberration diagram in the first embodiment.

FIG. 5 shows the aberration diagram of the magnified-projection optical system in the first Example based on the aforementioned lens arrangement and structure. FIG. 6 shows the lateral chromatic aberration of the magnified-projection optical system in the first Example. FIG. 5a shows the spherical aberration (SA), and FIG. 5b shows astigmatism (DS-DM). The aberration diagrams in FIGS. 5 and 6 indicate the values on the side of the display element 30 when the major wavelength is 546 nm.

Example 2

Figure 7:
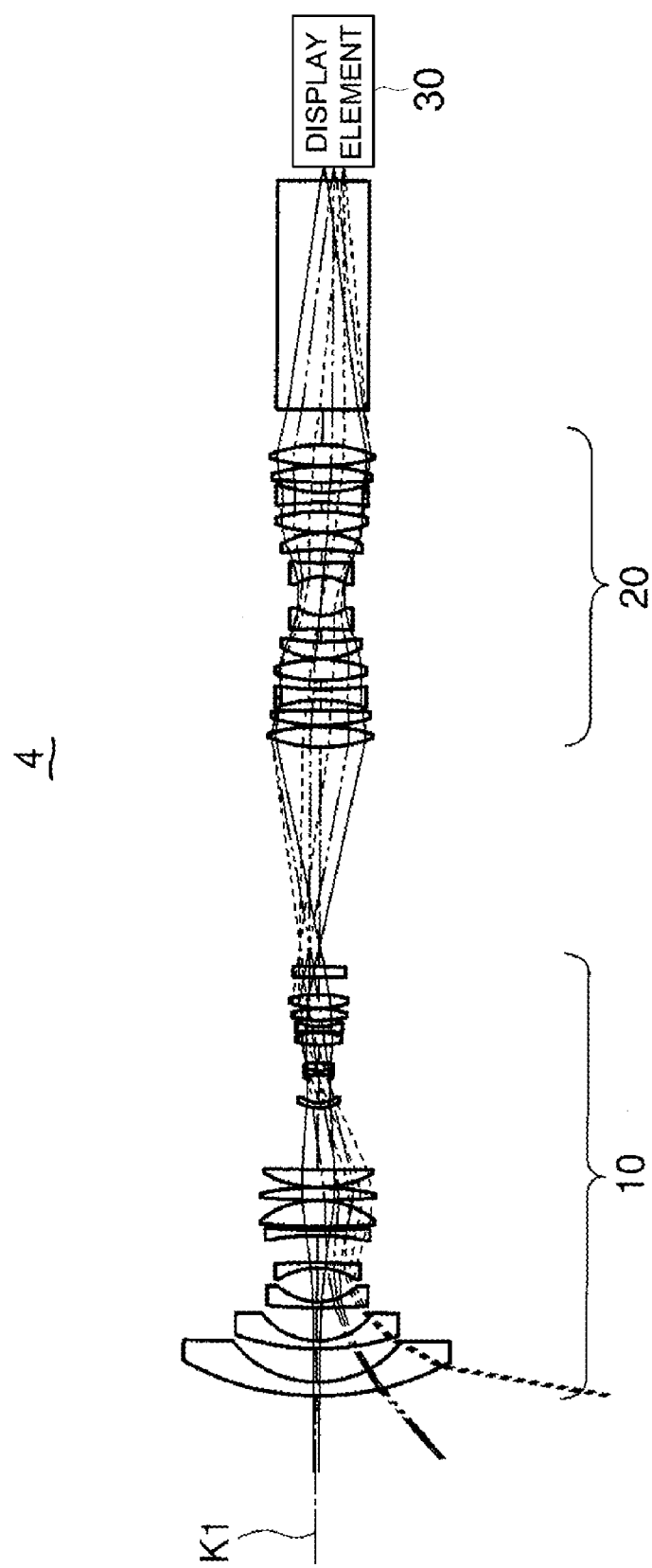
FIG. 7 is an overall schematic diagram representing a magnified-projection optical system in the second embodiment.

The following describes the magnified-projection optical system of the second Example. FIG. 7 overall schematic diagram representing the magnified-projection optical system. As shown in FIG. 7, the magnified-projection optical system 4 of the second Example includes a projection optical system 10, relay optical system 20 and display element 30 sequentially arranged along the optical axis K1 in that order as viewed from the screen 1, similarly to the case of FIG. 2.

Figure 8:
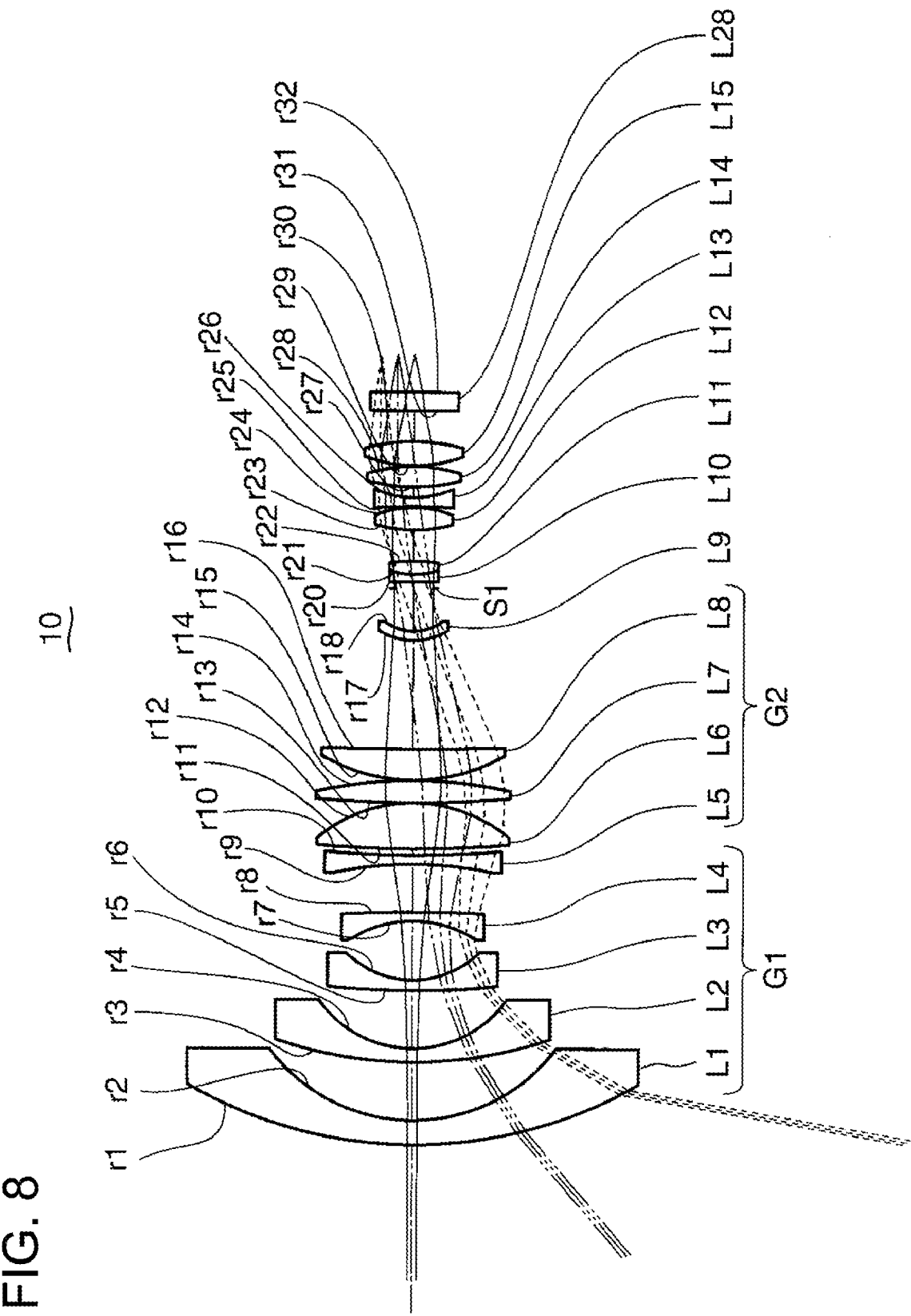
FIG. 8 is an overall schematic diagram representing a projection optical system in the second embodiment.

FIG. 8 is the overall schematic diagram representing the projection optical system 10. FIG. 9 is the overall schematic diagram representing the relay optical system 20 in the second Example. As will be apparent from comparison with FIG. 4, in the relay optical system 20 of FIG. 9, the length of the prism PR1 in the direction of optical axis K1 is greater than that of FIG. 4.

The following describes the construction data of each lens in the second Example.

Numerical value of Example 2

Unit: mm
Surface data

| Surface number: | r | d | nd | vd |
|---|---|---|---|---|
| Screen: |   | 6250.000 |   | 6250.00 |
| 1  | 95.304   | 5.37  | 1.51680 | 64.20 |
| 2  | 37.873   | 12.88 |         |       |
| 3  | 88.754   | 3.02  | 1.62041 | 60.34 |
| 4  | 24.357   | 12.79 |         |       |
| 5  | 182.335  | 2.35  | 1.65844 | 50.85 |
| 6  | 20.257   | 12.93 |         |       |
| 7  | −24.875  | 2.01  | 1.74400 | 44.90 |
| 8  | −281.494 | 10.53 |         |       |
| 9  | 79.050   | 2.01  | 1.80518 | 25.46 |
| 10 | 219.537  | 1.37  |         |       |
| 11 | 240.395  | 10.17 | 1.60342 | 38.01 |
| 12 | −31.592  | 0.07  |         |       |
| 13 | 243.462  | 4.92  | 1.60342 | 38.01 |
| 14 | −93.196  | 0.07  |         |       |
| 15 | 38.484   | 6.90  | 1.51680 | 64.20 |
| 16 | 718.601  | 23.83 |         |       |
| 17 | 13.942   | 2.01  | 1.75520 | 27.53 |
| 18 | 10.166   | 9.45  |         |       |
| 19 | (stop)   | ∞     | 1.33    |       |
| 20 | 2872.660 | 1.68  | 1.74400 | 44.90 |
| 21 | 14.802   | 2.93  | 1.51680 | 64.20 |
| 22 | −37.436  | 6.87  |         |       |
| 23 | 30.428   | 4.95  | 1.49700 | 81.61 |
| 24 | −21.769  | 0.20  |         |       |
| 25 | −136.321 | 2.01  | 1.80610 | 40.73 |
| 26 | 20.512   | 2.35  |         |       |
| 27 | 38.830   | 4.46  | 1.49700 | 81.61 |
| 28 | −33.882  | 0.20  |         |       |
| 29 | 28.787   | 5.30  | 1.49700 | 81.61 |
| 30 | −39.263  | 6.78  |         |       |
| 31 | ∞        | 4.03  | 1.51680 | 64.17 |
| 32 | ∞        | 8.39  |         |       |
| 33 | (dummy)  | 76.47 |         |       |
| 34 | 49.676   | 8.00  | 1.49700 | 81.61 |
| 35 | −64.928  | 0.30  |         |       |
| 36 | 55.221   | 6.00  | 1.49700 | 81.61 |
| 37 | 256.735  | 3.90  |         |       |
| 38 | −46.785  | 4.00  | 1.74330 | 49.22 |
| 39 | 108.213  | 3.50  |         |       |
| 40 | 59.460   | 8.00  | 1.49700 | 81.61 |
| 41 | −48.172  | 0.30  |         |       |
| 42 | 26.624   | 6.50  | 1.49700 | 81.61 |
| 43 | 68.863   | 5.06  |         |       |
| 44 | −173.041 | 5.20  | 1.56883 | 56.04 |
| 45 | 15.532   | 7.45  |         |       |
| 46 | (dummy)  | 7.45  |         |       |
| 47 | −15.532  | 5.20  | 1.56883 | 56.04 |
| 48 | 173.041  | 5.06  |         |       |
| 49 | −68.863  | 6.50  | 1.49700 | 81.61 |
| 50 | −26.624  | 0.30  |         |       |
| 51 | 48.172   | 8.00  | 1.49700 | 81.61 |
| 52 | −59.460  | 3.50  |         |       |
| 53 | −108.213 | 4.00  | 1.74330 | 49.22 |
| 54 | 46.785   | 3.90  |         |       |
| 55 | 256.735  | 6.00  | 1.49700 | 81.61 |
| 56 | −55.221  | 0.30  |         |       |
| 57 | 64.928   | 8.00  | 1.49700 | 81.61 |
| 58 | −49.676  | 13.50 |         |       |
| 59 | ∞        | 88.00 | 1.51680 | 64.20 |
| 60 | ∞        | 5.50  |         |       |

Display element ∞
Various forms of data
Major wavelength: 546 nm (620 nm 546 nm 460 nm)
Fl: −5.18
Fno.: 2.5
Angle of view: 160°
Conditional expression
(1) |Fb/F|: −13.88
(2) |F/Fpl|: −1.0
(3) |Fp/Fml|: L1-L4: −0.71
(4) Yp/Ym: 1.26
(5) vpm-vpp: 26.3

-continued

Numerical value of Example 2

(6) |θmax|: 0.6
(8) |φr × Tr|: 0.032
(A1) 240 degrees > W > 100 degrees:160 degrees
(A2) 240 degrees > Wp > 100 degrees:160 degrees
(A3) Le/TLp > 0.02:0.2
(A4) Dl/Fp < 40:17.9
(A5) 10 > Fbp/Fp > 0.5:3.4
(A7) 100 > |Fpm/Fp| > 2:24.2
(A8) 2 > |Frf/Frr| > 1:1
(A9) 2 > |Frm/F| > 0.5:8.3
(A10) 55 > vrm > 20:49.2
(A11) 120 > vdr > 65:81.6
(A12) Pgfr < 0.55:0.5
(A13) 0.8 > TLr1/TL > 0.4:0.63
(A14) 0.6 > TLr2/TL > 0.05:0.25
(A15) 0.8 > TLr2/TLr1 > 0.2:0.39
(B1) φRp/φRn: 0.42
(B2) φRp/fp: 0.35

Figure 10A:
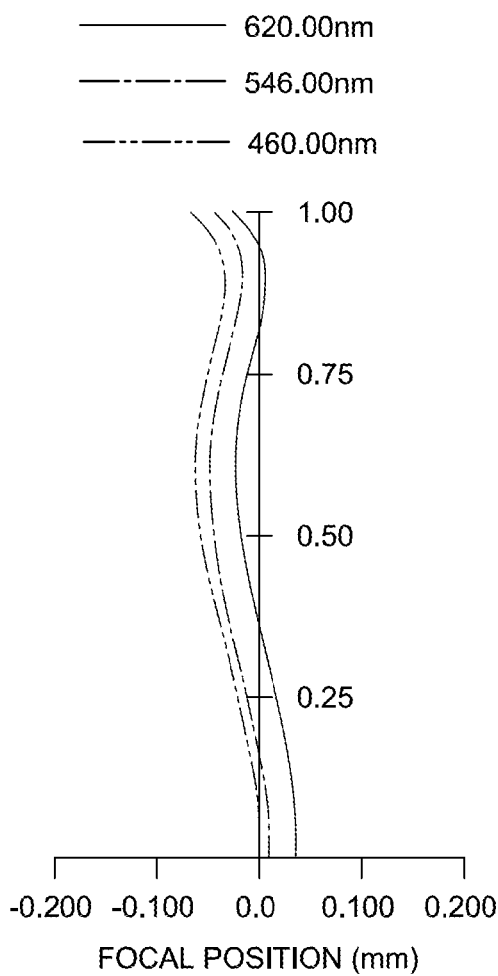
FIGS. 10a and 10b are aberration diagrams in the second embodiment.
Figure 10B:
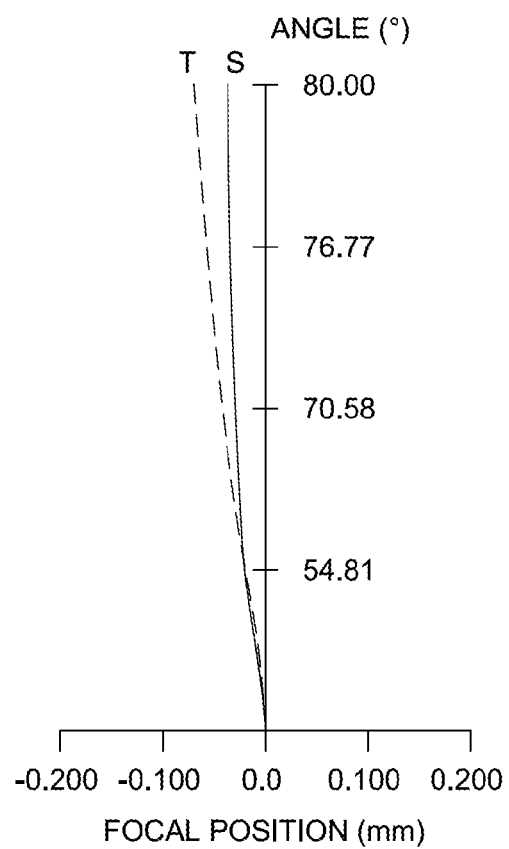

FIG. 10 is the aberration diagram representing the magnified-projection optical system in the second Example based on the aforementioned lens arrangement and structure. FIG. 10a shows the spherical aberration (SA), and FIG. 10b shows astigmatism (DS-DM). The aberration diagrams in FIGS. 10 and 11 indicate the values on the side of the display element 30 when the major wavelength is 546 nm.

The invention claimed is:

1. A magnified-projection optical system for magnified-projection of an image outputted from a display element onto a screen comprising: a projection optical system, a relay optical system and a display element, which are arranged sequentially along an optical axis in that order as viewed from a screen side,
wherein the relay optical system forms a primary image of the image outputted from the display element, and the projection optical system provides magnified-projection of the primary image formed by the relay optical system onto the screen and includes a negative group having a negative optical power and a positive group having a positive optical power arranged sequentially in that order as viewed from the screen;
wherein the negative group includes:
at least one negative meniscus lens arranged on the screen side; and
at least one negative lens;
wherein the projection optical system and the relay optical system satisfy the following conditional expressions (1) and (2):

$$|Fb/F| > 12 \quad (1)$$

$$0.5 < |F/Fp| < 2 \quad (2)$$

where Fb is a back focus of an entire optical system including the projection optical system and the relay optical system,
F is a focal distance of the entire optical system, and
Fp is a focal distance of the projection optical system.

2. The magnified-projection optical system described in claim 1, wherein an angle of view of the entire optical system satisfies the following conditional expression (A1):

$$240 \text{ degrees} > W > 100 \text{ degrees} \quad (A1)$$

where W is an angle of view of the entire optical system.

3. The magnified-projection optical system described in claim 1, wherein the projection optical system and the relay optical system satisfy the following conditional expression (3):

$$0.3 < |Fp/Fm| < 3 \quad (3)$$

where Fm is a focal distance of the negative group of the projection optical system and Fp is a focal distance of the projection optical system.

4. The magnified-projection optical system described in claim 1, wherein at least one positive lens is located closer to the screen than a position wherein an off-axis major light crosses the optical axis on a side closest to the screen.

5. The magnified-projection optical system described in claim 1, wherein the projection optical system and the relay optical system satisfy the following conditional expression (4):

$$Yp/Ym > 0.8 \quad (4)$$

where Yp is a maximum value for a height of light on the surface of the positive lens due to an off-axis paraxial tracing of a main light of an angle of view corresponding to seventy percent of the outermost angle of view, out of the positive lenses located closer to the screen than the position wherein the off-axis major light crosses the optical axis on the side closest to the screen, in the positive group of the projection optical system, and
Ym is a minimum value for a height of light on a surface of the negative lens due to an off-axis paraxial tracing of the main light of the angle of view corresponding to seventy percent of the outermost angle of view, in an area wherein there is an arrangement of the negative lens constituting the negative group of the projection optical system.

6. The magnified-projection optical system described in claim 1, wherein the positive group of the projection optical system includes at least one positive lens that satisfies the conditional expression (5):

$$20 < vpm - vpp < 65 \quad (5)$$

where vpm is an Abbe's number of a lens having the greatest Abbe's number in the negative group of the projection optical system; and vpp is an Abbe's number of the positive lens.

7. The magnified-projection optical system described in claim 1, wherein the relay optical system is an optical system wherein the side of the display element is approximately telecentric, and the approximately telecentric optical system satisfies the following conditional expression (6):

$$|\theta max| < 5 \quad (6)$$

where θmax is a maximum angle formed by a normal line of the display element and a major light traveling from the display element toward the relay optical system.

8. The magnified-projection optical system described in claim 7, wherein the relay optical system is approximately telecentric on both sides and the approximately telecentric optical system on both sides satisfies the following conditional expression (7):

$$|\theta'max| < 5 \quad (7)$$

where θ'max is a maximum angle formed by a normal line of the primary image forming surface and a major light passing through a primary image forming surface from the display element.

9. The magnified-projection optical system described in claim 8, wherein the approximately telecentric optical system on both sides satisfies the following conditional expression (8):

$$|\phi r \times Tr| < 0.2 \quad (8)$$

where φr is an optical power of the relay optical system, and Tr is a distance from the vertex of surface on the screen side of the lens located closest to the screen in the relay optical system, to the vertex of surface of the display element side of the lens located closest to the display element.

10. The magnified-projection optical system described in claim 1, wherein an entrance pupil position of the projection optical system and a total length of the projection optical system satisfy the following conditional expression (A3):

$$Le/TLp > 0.02 \quad (A3)$$

where Le is a distance from a vertex of surface of a lens located closest to the screen in the projection optical system, to the entrance pupil position when optical tracing is performed from the screen side of the projection optical system toward the display element; and TLp is the total length of the projection optical system.

11. The magnified-projection optical system described in claim 1, wherein an effective diameter of a lens closest to the screen in the projection optical system and the focal distance of the projection optical system satisfy the following conditional expression (A4):

$$D1/Fp < 40 \quad (A4)$$

where D1 is an effective diameter of the lens closest to the screen in the projection optical system, and Fp is the focal distance of the projection optical system.

12. The magnified-projection optical system described in claim 1, wherein focal distances of front and rear groups of the relay optical system satisfy the following conditional expression (A8):

$$2 > |Frf/Frr| > 0.5 \quad (A8)$$

where Frf is a focal distance of the front group of the relay optical system and Frr is a focal distance of the rear group of the relay optical system.

13. The magnified-projection optical system described in claim 1, wherein the relay optical system has at least two low-dispersion lenses and satisfies the following conditional expression (A11):

$$120 > vdr > 65 \quad (A11)$$

where vdr is an Abbe's number of the low-dispersion lenses of the relay optical system.

14. The magnified-projection optical system described in claim 1, wherein a major light having a maximum angle of view passing through at least one positive lens of the positive group in the projection optical system and a major light having a maximum angle of view passing through a lens located closest to the screen in the negative group in the projection optical system travel in a same direction with respect to the optical axis, and satisfy the following conditional expression (B1):

$$0.8 > \phi Rp/\phi Rn > 0.3 \quad (B1)$$

where $\phi Rp$ is a maximum of effective diameters of positive lenses of the positive group in the projection optical system, and $\phi Rn$ is an effective diameter on the screen side of a negative lens located closest to the screen in the projection optical system.

15. The magnified-projection optical system described in claim 14, wherein the maximum of effective diameters of the positive lenses of the positive group in the projection optical system and a focal distance of at least one positive lens in the positive group of the projection optical system satisfy the following conditional expression (B2):

$$4 > \phi Rp/fp > 0.05 \quad (B2)$$

where $\phi Rp$ is the maximum of the effective diameters of the positive lenses of the positive group in the projection optical system, and $\phi fp$ is a focal distance of at least one positive lens in the positive group of the projection optical system.

16. A digital type planetarium device including the magnified-projection optical system of claim 1.

* * * * *